(12) United States Patent
Ramanandan et al.

(10) Patent No.: US 10,267,924 B2
(45) Date of Patent: Apr. 23, 2019

(54) SYSTEMS AND METHODS FOR USING A SLIDING WINDOW OF GLOBAL POSITIONING EPOCHS IN VISUAL-INERTIAL ODOMETRY

(71) Applicant: QUALCOMM Incorporated, San Diego, CA (US)

(72) Inventors: Arvind Ramanandan, Sunnyvale, CA (US); Murali Chari, San Diego, CA (US); Yiming Chen, San Diego, CA (US); Avdhut Joshi, Carlsbad, CA (US); John Steven Lima, West Terre Haute, IN (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/703,588

(22) Filed: Sep. 13, 2017

(65) Prior Publication Data
US 2018/0188384 A1    Jul. 5, 2018

Related U.S. Application Data

(60) Provisional application No. 62/442,419, filed on Jan. 4, 2017.

(51) Int. Cl.
*G01S 11/12* (2006.01)
*G01S 19/45* (2010.01)
(Continued)

(52) U.S. Cl.
CPC ............. *G01S 19/45* (2013.01); *G01S 19/47* (2013.01); *G01S 19/52* (2013.01); *G01S 19/53* (2013.01); *G01S 11/12* (2013.01)

(58) Field of Classification Search
CPC .......... G01S 19/47; G01S 19/52; G01S 19/45; G01S 11/02
See application file for complete search history.

(56) References Cited

U.S. PATENT DOCUMENTS

| 2008/0167814 | A1* | 7/2008 | Samarasekera ...... G01C 21/005 701/469 |
| 2009/0248304 | A1* | 10/2009 | Roumeliotis .......... G01C 21/16 701/500 |

(Continued)

FOREIGN PATENT DOCUMENTS

| CN | 105806340 A | 7/2016 |
| CN | 106017474 A | 10/2016 |
| WO | 2015168451 A1 | 11/2015 |

OTHER PUBLICATIONS

Li et al.; Improving the Accuracy of EKF-Based Visual-Inertial Odometry; May 14-18, 2012; 2012 IEEE Intl. Conf. on Robotics and Automation; St. Paul, MN; pp. 828-835 (Year: 2012).*

(Continued)

*Primary Examiner* — Michael J Zanelli
(74) *Attorney, Agent, or Firm* — Austin Rapp & Hardman, P.C.

(57) ABSTRACT

A method for visual inertial odometry (VIO)-aided global positioning is described. The method includes updating an extended Kalman filter (EKF) state including a current pose and a sliding window of multiple prior poses. The sliding window includes poses at a number of most recent global positioning system (GPS) time epochs. Updating the EKF includes updating an EKF covariance matrix for the prior poses and the current pose in the EKF state. The method also includes determining, at a GPS epoch, a relative displacement between each of the updated prior poses and the current pose. The method further includes determining an error covariance of each of the relative displacements based (Continued)

on cross-covariances between each of the updated prior poses and the current pose in the EKF covariance matrix. The method additionally includes using the relative displacements and the error covariances to fuse pseudorange measurements taken over multiple epochs.

28 Claims, 10 Drawing Sheets

(51) Int. Cl.
  *G01S 19/47* (2010.01)
  *G01S 19/52* (2010.01)
  *G01S 19/53* (2010.01)

(56) References Cited

U.S. PATENT DOCUMENTS

| | | |
|---|---|---|
| 2014/0375493 A1 | 12/2014 | Weisenburger et al. |
| 2016/0305784 A1 | 10/2016 | Roumeliotis et al. |
| 2017/0031032 A1 | 2/2017 | Garin et al. |
| 2017/0219716 A1* | 8/2017 | Niesen .................... G01S 19/47 |
| 2017/0219717 A1* | 8/2017 | Nallampatti Ekambaram ............ G01S 19/42 |
| 2017/0227656 A1* | 8/2017 | Niesen .................... G01S 19/47 |

OTHER PUBLICATIONS

Hong S., et al., "A Pose Graph Based Visual SLAM Algorithm for Robot Pose Estimation", 2014 World Automation Congress (WAC), TSI Press, Aug. 3, 2014, pp. 917-922, XP032669434, DOI: 10.1109/WAC.2014.6936197 [retrieved on Oct. 24, 2014].

International Search Report and Written Opinion—PCT/US2017/057889—ISA/EPO—Feb. 9, 2018.

Mourikis et al., "A Multi-State Constraint Kalman Filter for Vision-aided Inertial Navigation", 2007 IEEE International Conference on Robotics and Automation—Apr. 10-14, 2007—Roma, Italy, IEEE, Piscataway, NJ, USA, XP031389349, ISBN: 978-1-4244-0601-2, Apr. 10, 2007 (Apr. 10, 2007), pp. 3565-3572.

\* cited by examiner

SYSTEMS AND METHODS FOR USING A SLIDING WINDOW OF GLOBAL POSITIONING EPOCHS IN VISUAL-INERTIAL ODOMETRY

RELATED APPLICATION

This application is related to and claims priority to U.S. Provisional Patent Application Ser. No. 62/442,419, filed Jan. 4, 2017, for "SYSTEMS AND METHODS FOR USING SLIDING WINDOW OUTPUTS AT GLOBAL POSITIONING EPOCHS IN A VISUAL-INERTIAL ODOMETRY SYSTEM."

FIELD OF DISCLOSURE

The present disclosure relates generally to electronic devices. More specifically, the present disclosure relates to systems and methods for using a sliding window of global positioning epochs in visual-inertial odometry (VIO).

BACKGROUND

Some electronic devices (e.g., cameras, video camcorders, digital cameras, cellular phones, smart phones, computers, televisions, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, drones, healthcare equipment, set-top boxes, etc.) capture and/or utilize images. For example, a smart phone may capture and/or process still and/or video images. Processing images may demand a relatively large amount of time, memory, and energy resources. The resources demanded may vary in accordance with the complexity of the processing.

In some cases, images may be utilized in computer vision applications. For example, computer vision may be utilized to detect objects. However, computer vision may suffer from some limitations. As can be observed from this discussion, systems and methods that improve computer vision may be beneficial.

SUMMARY

A method for visual inertial odometry (VIO)-aided global positioning is described. The method includes updating an extended Kalman filter (EKF) state including a current pose of an electronic device and a sliding window of multiple prior poses using measurements up to a current epoch. The sliding window of multiple prior poses includes poses of the electronic device at a number of most recent global positioning system (GPS) time epochs. The updating includes updating an EKF covariance matrix for the prior poses and the current pose in the EKF state. The method also includes determining, at a GPS epoch, a relative displacement between each of the updated prior poses and the current pose. The method further includes determining an error covariance of each of the relative displacements based on cross-covariances between each of the updated prior poses and the current pose in the EKF covariance matrix. The method additionally includes using the relative displacements and the error covariances to fuse pseudorange measurements taken over multiple epochs. A vehicle may include the electronic device.

The method may include removing outlier pseudorange measurements from a set of pseudorange measurements based on the relative displacements between the updated prior poses and the current pose. The method may include weighting inlier pseudorange measurements using the error covariances of the relative displacements. The method may include determining an absolute position fix using inlier pseudorange measurements.

The relative displacements may be determined using VIO measurements. The relative displacements may be utilized to propagate electronic device pose between GPS epochs. The method may include determining whether to insert a GPS measurement based on an amount of distance traveled.

An electronic device for visual inertial odometry (VIO)-aided global positioning is also described. The electronic device includes a memory and a processor coupled to the memory. The processor is configured to update an extended Kalman filter (EKF) state including a current pose of the electronic device and a sliding window of multiple prior poses using measurements up to a current epoch. The sliding window of multiple prior poses includes poses of the electronic device at a number of most recent global positioning system (GPS) time epochs The updating includes updating an EKF covariance matrix for the prior poses and the current pose in the EKF state. The processor is also configured to determine, at a GPS epoch, a relative displacement between each of the updated prior poses and the current pose. The processor is further configured to determine an error covariance of each of the relative displacements based on cross-covariances between each of the updated prior poses and the current pose in the EKF covariance matrix. The processor is additionally configured to use the relative displacements and the error covariances to fuse pseudorange measurements taken over multiple epochs.

A non-transitory tangible computer-readable medium storing computer executable code is also described. The computer-readable medium includes code for causing an electronic device to update an extended Kalman filter (EKF) state including a current pose of the electronic device and a sliding window of multiple prior poses using measurements up to a current epoch. The sliding window of multiple prior poses includes poses of the electronic device at a number of most recent global positioning system (GPS) time epochs. The updating includes updating an EKF covariance matrix for the prior poses and the current pose in the EKF state. The computer-readable medium also includes code for causing the electronic device to determine, at a GPS epoch, a relative displacement between each of the updated prior poses and the current pose. The computer-readable medium further includes code for causing the electronic device to determine an error covariance of each of the relative displacements based on cross-covariances between each of the updated prior poses and the current pose in the EKF covariance matrix. The computer-readable medium additionally includes code for causing the electronic device to use the relative displacements and the error covariances to fuse pseudorange measurements taken over multiple epochs.

An apparatus is also described. The apparatus includes means for updating an extended Kalman filter (EKF) state including a current pose of the apparatus and a sliding window of multiple prior poses using measurements up to a current epoch. The sliding window of multiple prior poses includes poses of the apparatus at a number of most recent global positioning system (GPS) time epochs. The updating includes updating an EKF covariance matrix for the prior poses and the current pose in the EKF state. The apparatus also includes means for determining, at a GPS epoch, a relative displacement between each of the updated prior poses and the current pose. The apparatus further includes means for determining an error covariance of each of the relative displacements based on cross-covariances between each of the updated prior poses and the current pose in the EKF covariance matrix. The apparatus additionally includes means for using the relative displacements and the error covariances to fuse pseudorange measurements taken over multiple epochs.

DETAILED DESCRIPTION

Figure 1:
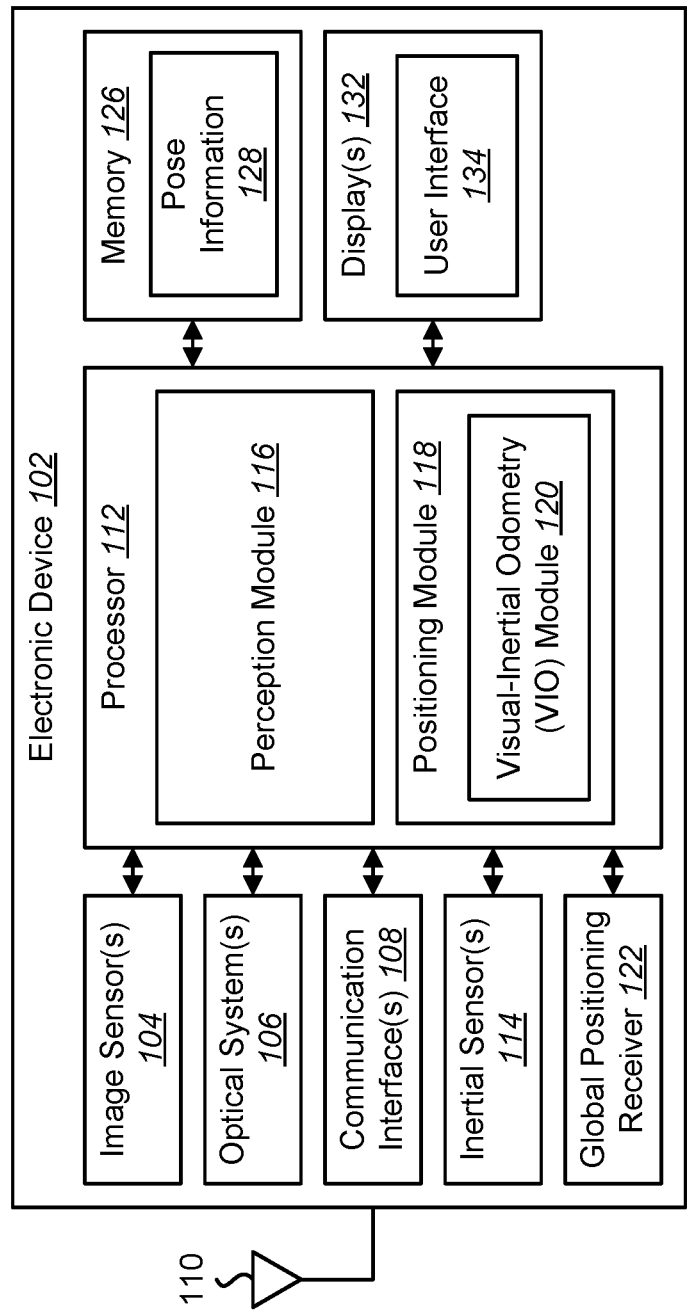
FIG. 1 is a block diagram illustrating one example of an electronic device in which systems and methods for using a sliding window of global positioning epochs in visual-inertial odometry (VIO) may be implemented.

Some configurations of the systems and methods disclosed herein may relate to using a sliding window of global positioning epochs in visual-inertial odometry (VIO). VIO may enable highly precise positioning and mapping capability with a set of economically viable sensors and processors, as compared to other highly expensive solutions. Specifically, VIO may fuse information from at least a camera and inertial sensor(s) (e.g., gyroscopes and accelerometers), to estimate device pose.

In one example, a vehicle may be equipped with a global positioning system (GPS) and a VIO system. The GPS may update at a relatively slow rate (e.g., 1 hertz (Hz)), while the VIO system may update much more frequently (e.g., 100 Hz). GPS and VIO may be used to determine vehicle position in order to control an autonomous driving system. For example, GPS may provide position information at 1 Hz, and VIO may be used to provide position information between GPS updates. One problem with this approach is that VIO may suffer from significant errors in estimating displacement due to a lack of visual features and/or noisy measurements in estimating heading. Another problem is that GPS may suffer from a lack of directly visible satellites. For example, buildings can obstruct and/or reflect GPS signals, which may lead to multipath errors. A Kalman filter may be used to estimate vehicle position with a combination of VIO and GPS. For example, the Kalman filter may be used to obtain vehicle position estimates when updated with VIO and GPS data. However, due to some of the aforementioned problems, the vehicle position estimates suffer from inaccuracies when based on current states only.

Some configurations of the systems and methods disclosed herein may ameliorate some of these problems. For example, the Kalman filter can be extended to include states corresponding to one or more prior GPS estimates. When the extended Kalman filter is updated, the prior GPS estimates can also be refined. Using the refined data of one or more prior states for combining (e.g., fusing) GPS and VIO may result in improved position estimates. The improved position estimates may help the autonomous driving system control the vehicle with greater precision. Another advantage to this approach is that VIO and GPS may be less expensive to implement than other costly solutions (e.g., LIDAR). Accordingly, highly accurate autonomous driving systems (or other systems) may be provided to consumers at reduced cost.

VIO may have advantages over other techniques. For example, a single camera may be able to estimate relative position, but it may not be able to provide absolute scale (e.g., actual distances between objects and/or the size of objects (in meters or feet, for example)). Inertial sensors may provide absolute scale and may take measurement samples at a higher rate in some configurations, thereby improving robustness for fast device motion. However, sensors, particularly low-cost micro-electro-mechanical systems (MEMS) varieties, may be prone to substantial drifts in position estimates compared to cameras. Accordingly, VIO may combine camera and inertial sensor inputs to accurately estimate device pose.

VIO may or may not also be used with a global positioning system (GPS) and/or GNSS (Global Navigation Satellite System). As used herein, the terms "GPS" and "GNSS" may be used interchangeably to refer to a global satellite positioning system. In addition to economic advantages, the accuracy of VIO may provide advantages over pure GPS. For example, pure GPS may degrade significantly in multipath environment, especially in deep urban scenarios.

In some configurations of the systems and methods disclosed herein, VIO systems may provide relative translational displacements for removing outlier GPS measurements (e.g., pseudoranges) and computing a position estimate from the inlier measurements. Since GPS measurements are impacted by multipath (in addition to other distortions, for example), it may be beneficial to accumulate a sufficient number of "correct" GPS measurements over a suitably large (e.g., several seconds) time window in order to compute an accurate positioning estimate of the vehicle in the world coordinate frame. While the instantaneous output of a VIO system may be used to compute these relative displacements, across past GPS epochs, this approach may suffer from one or more of the following problems: a) computed relative displacements may have significant errors (e.g., 10% or higher) relative to ground truth displacements; and/or b) if an instantaneous VIO output is used (only, for example), beneficial cross-covariance estimates for the VIO pose outputs at GPS epochs may not be available (and accordingly may not be used for subsequent processing and/or fusion, for example).

In some configurations, additional states may be added in an extended Kalman filter (EKF) used in VIO. An EKF may be a Kalman filter (e.g., a prediction and correction algorithm) that is applied to a non-linear problem or system. The additional states may correspond to the vehicle rotation (3D) and translation (3D) at past GPS time epochs. In some approaches, the number of prior epochs may be configurable (from N=2, 3, . . . 64, for example). Since the length of the window may be fixed, the (GPS) time instants included in the window may change with time. For example, as each new GPS epoch is added, a last GPS epoch may be removed.

As a result, the poses of VIO corresponding to the GPS epochs in the sliding window may get continuously updated as new camera frames are received. In a sense, this may provide a benefit of 'refining' past VIO pose estimates with subsequent (e.g., 'future') information. This can be viewed as an instance of VIO providing 'smoothed' filtered outputs at GPS epochs.

In some configurations, the covariance across the poses in the GPS sliding window may be immediately available from the EKF's covariance matrix update. This may enable more accurate characterization of the error covariance of the relative displacement of the vehicle between GPS epochs. A substantial reduction in the error in the relative displacements from VIO may be observed when using the 'smoothed' outputs from the GPS sliding window.

Even with increased EKF state size, significant benefits may be observed even for window sizes of N=2, 4. Moreover, the outlier removal and GPS fusion (e.g., outlier removal and GPS fusion blocks) may also benefit from the improved accuracy of the relative displacements from VIO.

Some configurations of the systems and methods disclosed herein may be beneficial. For example, there is a demand for precise positioning and mapping for vehicle-to-vehicle or vehicle-to-infrastructure (V2X) applications, advanced driver assistance systems (ADAS), and/or autonomous vehicles at low cost.

Some approaches may provide precise positioning using GPS/GNSS, VIO, and/or mapping. Precise mapping may rely on precise positioning, precise feature localization based on computer vision (CV) (e.g., triangulation, bundle adjustment (BA), etc.). For example, autonomous driving tasks may include precise positioning, perception, and/or planning. Perception based on sensor data may provide detection and tracking of obstacles in a local environment. Precise ego-positioning and mapping may provide semantic information to help understand the constraints from a road network. A planning and motion control layer, which is a functional layer in a device for route planning and motion control (e.g., steering), may decide the right action based on inputs from the perception and ego-positioning tasks. Precise positioning, which may include ego-positioning and/or positioning data for other tasks (e.g., mapping), may include delivering absolute vehicle location in a GPS global coordinate system and/or relative vehicle pose in a map coordinate system. Precise mapping may include delivering cost effective solutions to collect, generate, and/or update map features.

Mapping may be an element of autonomous driving. In some approaches, a map may include semantic information (which may help a vehicle to understand the road network constraints) and/or localization features (which may help a vehicle to localize itself precisely).

Mapping to support autonomous driving may include depth (e.g., a rich semantic representation of the environment), accuracy (e.g., precise positioning of map elements), and/or freshness (e.g., an ability to process, recognize, and/or update map elements in real-time or near real-time). How to deliver accurate maps in real-time (or near real-time) is a key challenge for the industry to commercialize autonomous driving.

One or more technologies may be utilized to enable precise positioning. For example, a sensor sync board may enable tight synchronization and accurate timestamping over multiple sensors (e.g., IMU, GPS, and/or camera). Additionally or alternatively, visual inertial odometry (VIO) and/or tight coupling GPS/GNSS with VIO may enable precise positioning. Additionally or alternatively, fusion with localization features in maps may enable precise positioning. For example, GPS and VIO positioning may be fused with signs and/or lane markers to enable accurate positioning.

Visual-inertial odometry (VIO) may be utilized for accurate localization. For instance, VIO may be utilized to accurately compute a 6 degrees of freedom (DOF) pose (e.g., a body pose, a camera pose, a vehicle pose, a rover pose, etc.). The pose may be computed in a spatial frame (e.g., relative frame) and/or in a global frame of reference. A spatial frame may be a frame relative to an arbitrary point that may be fixed relative to Earth. A spatial frame may be a referred to as a relative frame because the spatial frame is relative to an arbitrary point (e.g., starting point, position of a sensor at time t=0, etc.). A global frame of reference is a frame relative to the Earth. One example of an approach to VIO is provided as follows. Camera frames (e.g., a monocular camera with VGA resolution at 30 frames per second (fps)) may be provided for three-dimensional (3D) feature processing. For example, a processor may estimate 3D features (e.g., corners and/or keypoints with depth) based on the camera frames. Accelerometer measurements (e.g., samples at 100 hertz (Hz) or more, 200 Hz, etc.) and gyroscope measurements (e.g., samples at 100 Hz or more, 200 Hz, etc.) may be provided to inertial data processing. The 3D feature processing and inertial data processing outputs may be provided to a main VIO system for continuous localization and/or camera and inertial sensor data fusion. The outputs of VIO may include a 6 DOF pose (e.g., relative position and/or orientation at 30 Hz, for instance). For example, outputs may include rotation (3 axis) and/or translation (3 dimensions) relative to a global frame, inertial sensor biases, a gravity vector, and/or a sparse 3D map of feature points. Feature points may be corners, keypoints, etc., in an image that may relate to an object in the real world. VIO may be implemented on a smartphone, tablet, robot, VR platform, and/or automotive platform, for example.

A rationale for sensor fusion is given as follows. Inertial sensor parameters (e.g., bias, scale, non-orthogonality, and/or misalignment) may need continuous estimation. Vision sensing may be accurate, but may need a sufficient amount of features. Also scale (e.g., scale in meters, feet, inches, etc.) may not be determinate in vision sensing alone. Sensor fusion may combine higher rate (e.g., 100 Hz, 200 Hz, 500 Hz, etc.) inertial measurements and fewer accurate features in some configurations. Inertial sensors and/or VIO may provide measurements at a higher rate (e.g., 100 Hz, 200 Hz, 500 Hz, etc.) in comparison to GPS (e.g., 1 Hz, 5 Hz, 10 Hz, etc.).

Some challenges to VIO for an automotive platform may include one or more of the following. Implementations in an automotive environment may address initialization and crash recovery, may reduce/improve scale drift during lack of observability of IMU measurements, may provide robustness to non-rigid scenes (e.g., rigid road with moving vehicles), may provide outlier rejection (e.g., rejection of erroneous measurements), and/or may provide modeling of a non-holonomic system. Challenges for an automotive camera may include rolling shutter motion compensation and/or wide dynamic range (WDR) and multiple exposures, as they may introduce timing errors. For example, rolling shutter may introduce timing errors due to sequential sampling and/or readout of pixels, where an image frame is obtained over a range of time and not at one instant. WDR and multiple exposures may introduce timing errors, as WDR may be handled by combining multiple exposures over time.

In some configurations additional sensors may be utilized for enhanced robustness. For example, lidar may be coupled with visual odometry. Additionally or alternatively, car sensors may be used, such as wheel encoders and wheel direction. A goal for automotive platforms may be to achieve low drift in relative 6 DOF pose in the automotive environment. The 6 DOF pose may be relative to a starting point (e.g., position at time t=0).

VIO and GPS fusion may be utilized to achieve high performance with cost effective sensors in some configurations. For example, GPS/GNSS measurements and local/relative coordinate measurements from VIO may be tightly coupled to achieve highly accurate global positioning. Some configurations may integrate accurate measurements over time.

Some configurations of the systems and methods described herein may include accurate and highly optimized VIO, an optimized algorithm using an extended Kalman filter, accurate time stamping, and/or efficient processing by using a digital signal processor (DSP).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for using a sliding window of global positioning epochs in visual-inertial odometry (VIO) may be implemented. Examples of the electronic device 102 include vehicles (e.g., semi-autonomous vehicles, autonomous vehicles, etc.), automobiles, robots, aircraft, drones, unmanned aerial vehicles (UAVs), servers, computers (e.g., desktop computers, laptop computers, etc.), network devices, cameras, video camcorders, digital cameras, cellular phones, smart phones, tablet devices, personal cameras, wearable cameras, virtual reality devices (e.g., headsets), augmented reality devices (e.g., headsets), mixed reality devices (e.g., headsets), action cameras, surveillance cameras, mounted cameras, connected cameras, healthcare equipment, gaming consoles, appliances, etc. The electronic device 102 may include one or more components or elements. One or more of the components or elements may be implemented in hardware (e.g., circuitry), a combination of hardware and software (e.g., a processor with instructions), and/or a combination of hardware and firmware.

In some configurations, the electronic device 102 may be a vehicle or may be included in a vehicle configured to produce pose information (e.g., object location information, object position information, object orientation information, camera pose information, vehicle pose information, mapping information, etc.). For example, the electronic device 102 may determine pose information based on VIO and GPS. In some configurations, the electronic device 102 may be a vehicle in communication with one or more other vehicles. For example, the electronic device 102 may send information (e.g., pose information, object location information, object position information, object orientation information, camera pose information, vehicle pose information, mapping information, journey information, object detection information, raw image information, etc.) to one or more vehicles and/or may receive information from one or more vehicles (e.g., may share information). In some approaches, the electronic device 102 may produce and/or receive pose information (e.g., mapping information), which may be shared with one or more other vehicles.

In some configurations, the electronic device 102 may be a network device (e.g., server, cloud device, etc.) that communicates with one or more vehicles. In some approaches, one or more of the vehicles may be an autonomous vehicle, a self-driving vehicle, and/or may have an Advanced Driver Assistance System (ADAS), etc. For example, the electronic device 102 may receive information (e.g., VIO information, GPS information, journey information, object detection information, raw image information, etc.) from one or more vehicles. The electronic device 102 may determine pose information (e.g., 3D pose information, 3D mapping information, refined object location information, etc.), which the electronic device 102 may provide to one or more vehicles.

In some configurations, the electronic device 102 may include a processor 112, a memory 126, one or more displays 132, one or more image sensors 104, one or more optical systems 106, one or more communication interfaces 108, one or more inertial sensors 114, and/or one or more global positioning receivers 122 (e.g., GPS receiver(s), Global Navigation Satellite System (GNSS) receiver(s), etc.). The processor 112 may be coupled to (e.g., in electronic communication with) the memory 126, display(s) 132, image sensor(s) 104, optical system(s) 106, communication interface(s) 108, inertial sensor(s) 114, and/or global positioning receivers 122. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132. Additionally or alternatively, the electronic device 102 may or may not include a communication interface 108.

In some configurations, the electronic device 102 may perform one or more of the functions, procedures, methods, steps, etc., described in connection with one or more of FIGS. 1-10. Additionally or alternatively, the electronic device 102 may include one or more of the structures described in connection with one or more of FIGS. 1-10.

The communication interface(s) 108 may enable the electronic device 102 to communicate with one or more other electronic devices (e.g., network devices, servers, computers, vehicles, smart phones, tablet devices, etc.). For example, the communication interface(s) 108 may provide an interface for wired and/or wireless communications. In some configurations, the communication interface(s) 108 may be coupled to one or more antennas 110 for transmitting and/or receiving radio frequency (RF) signals. Additionally or alternatively, the communication interface(s) 108 may enable one or more kinds of wireline (e.g., Universal Serial Bus (USB), Ethernet, etc.) communication.

In some configurations, multiple communication interfaces 108 may be implemented and/or utilized. For example, one communication interface may be a cellular (e.g., 3G, Long Term Evolution (LTE), CDMA, etc.) communication interface, another communication interface may be an Ethernet interface, another communication interface may be a universal serial bus (USB) interface, and yet another communication interface may be a wireless local area network (WLAN) interface (e.g., Institute of Electrical and Electronics Engineers (IEEE) 802.11 interface). In some configurations, the communication interface(s) 108 may send information (e.g., pose information, image information, location information, object detection information, map information, etc.) to and/or receive information from another electronic device (e.g., a vehicle, a smart phone, a camera, a display, a remote server, etc.).

In some configurations, the electronic device 102 may obtain one or more images (e.g., digital images, image frames, video, etc.). For example, the electronic device 102 may include the image sensor(s) 104 and the optical system(s) 106 (e.g., lenses) that focus images of scene(s) and/or object(s) that are located within the field of view of the optical system onto the image sensor 104. The optical system(s) 106 may be coupled to and/or controlled by the processor 112.

A camera (e.g., a visual spectrum camera or otherwise) may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, stereoscopic images, wide-angle images, etc.). In some implementations, the electronic device 102 may include a single image sensor 104 and/or a single optical system 106. For example, a single camera with a particular resolution (e.g., video graphics array (VGA) resolution, 1280×800 pixels, etc.), at a particular frame rate (e.g., 30 frames per second (fps), 60 fps, 120 fps, etc.) may be utilized. In other implementations, the electronic device 102 may include multiple optical system(s) 106 and/or multiple image sensors 104. For example, the electronic device 102 may include two or more lenses in some configurations. The lenses may have the same focal length or different focal lengths.

Additionally or alternatively, the electronic device 102 may request and/or receive the one or more images from another electronic device or device (e.g., vehicle camera(s), one or more external cameras coupled to the electronic device 102, a network server, traffic camera(s), etc.). In some configurations, the electronic device 102 may request and/or receive the one or more images via the communication interface 108. For example, the electronic device 102 may or may not include camera(s) (e.g., image sensor(s) 104 and/or optical system(s) 106) and may receive images from one or more remote devices (e.g., vehicles).

One or more of the images (e.g., image frames) may include one or more scene(s) and/or one or more object(s). In some cases, the image(s) may include one or more objects (e.g., landmarks, road signs, lane markers, traffic lights, construction zone cones, barriers, light poles, road markings, trees, landscapes, stationary objects, etc.).

In some examples, the image sensor(s) 104 and/or the optical system(s) 106 may be mechanically coupled to the electronic device 102 or to a remote electronic device (e.g., may be attached to, mounted on, and/or integrated into the body of a vehicle, the hood of a car, a rear-view mirror mount, a side-view mirror, a bumper, etc., and/or may be integrated into a smart phone or another device, etc.). The image sensor(s) 104 and/or optical system(s) 106 may be linked to the electronic device 102 via a wired and/or wireless link. For example, the image sensor(s) 104 and/or optical system(s) 106 may be hardwired to a control mechanism (e.g., processor 112) in a vehicle or information captured by the image sensor(s) 104 and/or optical system(s) 106 may be wirelessly transmitted (e.g., streamed or otherwise wirelessly transported) to the control mechanism (e.g., processor 112).

In some configurations, the image sensor(s) 104 (e.g., camera(s)) and inertial sensor(s) 114 (e.g., IMU) may be mounted on the same rigid frame (e.g., rigid mounting frame, rigid vehicle frame, etc.), and rigidly with respect to a GPS antenna (e.g., one or more antennas of the one or more antennas 110 described in connection with FIG. 1). In some implementations where multiple cameras are used, additional camera(s) may be mounted in a rigid manner with respect to a primary camera (e.g., main computer vision (CV) camera).

In some approaches, an approximate estimate for the coordinates of the origin of the image sensor 104 (e.g., camera) reference frame in the inertial sensor 114 (e.g., accelerometer) reference frame may be predetermined (e.g., from offline measurements, tape measurements, etc.). An approximate estimate for a rotation matrix that transforms points in the image sensor 104 (e.g., camera) reference frame to the inertial sensor 114 (e.g., accelerometer) reference frame may be predetermined. In some implementations, image frames (e.g., CV camera(s) frames) and inertial sensor 114 (e.g., IMU) measurements may be timestamped with a common clock with a degree of accuracy (e.g., an accuracy of within 100 microseconds (μs)).

In some approaches, the image sensor 104 (e.g., camera) height, pitch, and/or roll angle may be determined offline using a calibration procedure. For example, a vehicle may be stationary during calibration and/or initialization of VIO. Additionally or alternatively, a vector between the camera center and the global positioning receiver 122 (e.g., GPS/GNSS receiver and/or the GPS antenna) may be determined in the image sensor 104 (e.g., camera) frame of reference. For example, a vector between the image sensor 104 (e.g., camera) center and a GPS antenna may be measured (e.g., measured offline) and accounted for (during runtime, for example).

In some configurations, one or more sensors (e.g., front end sensors, camera(s), image sensor(s) 104, IMU, inertial sensor(s) 114, and/or global positioning receiver 122, etc.) may be consumer grade sensors. In some approaches, the image sensor(s) 104, inertial sensor(s) 114, and/or global positioning receiver 122 may send their input into a sensor synchronization ("sync") board (not shown) before it is sent to the processor 112. For example, the electronic device 102 may include a sensor sync board in some configurations. The sensor synchronization board may include an embedded micro controller. In some approaches, the sensor synchronization board may control time stamps of all sensors. The timing error of the time stamps may be less than a specified amount (e.g., less than 10 microsecond (μs) timing error).

One function of the sensor sync board may be to record the timestamps of all sensors (e.g., all sensors involved in positioning and/or mapping), using the same internal system clock (with a specified error, such as <10 μs). Consistency may be maintained even if the global positioning (e.g., GPS) receiver 122 is not synchronized to GPS time.

The sensor sync board may perform one or more of the following functionalities. The sensor sync board may receive synchronization signals (e.g., one pulse per frame exposure) from one or more (e.g., four) cameras and time-tag the synchronization signals in system clock units. Alternatively (or simultaneously, for example), the sensor sync board may generate camera trigger signals at a predetermined update rate. In some configurations, the sensor sync board may periodically initiate a reading sequence onto the inertial sensor(s) 114 (e.g., IMU sensor(s)). The sensor sync board may time tag the inertial sensor(s) 114 (e.g., IMU) data. In some configurations, the sensor sync board may manage (e.g., may manage configuration, fix rate, and/or binary message output list, etc.) the global positioning receiver 122 (e.g., built-in GPS receiver). The sensor sync board may collect raw data and position, time, and/or velocity from the global positioning 122 receiver. The sensor sync board may receive and time-tag a GPS-generated one pulse per second (1PPS) signal.

It should be noted that the sensor sync board may be designed to have the capability of being daisy chained to other similar boards, providing global synchronization capability across the electronic device 102 (e.g., vehicle). For example, one board may be the master, and may synchronize all other boards onto its own internal clock.

In some configurations (for compactness, for example), the sensor sync board may physically incorporate both the global positioning (e.g., GPS) receiver 122 and the inertial sensor(s) 114 (e.g., IMU sensors). For instance, the sensor sync board may include MEMS inertial sensors (including gyroscope and accelerometer) and a GPS/GNSS receiver. In some configurations, the sensor sync board may work with the image sensor(s) 104 (e.g., camera sensor(s)). For example, a mono camera may be utilized in some implementations, which has rolling shutter and high dynamic range (HDR) capability for automotive use cases. Further, the camera may provide a synchronization signal that marks the starting point of a frame.

One challenge for tight sensor fusion is to obtain accurate time stamps over multiple sensors (e.g., GPS/GNSS, vision, IMU, etc.). Even millisecond-order differences may affect accuracy. In some configurations, the sensor sync board may trigger image sensor 104 (e.g., camera) capture and/or read a timestamp from an image sensor 104 (e.g., camera). As described above, some examples of the sensor sync board may include an embedded IMU and/or may trigger IMU reading with an accurate timestamp. Additionally or alternatively, some examples of the sensor sync board may include embedded GPS/GNSS. Timestamp accuracy may be targeted on the order of microseconds (e.g., <10 microseconds (µs)).

The memory 126 may store instructions and/or data. The processor 112 may access (e.g., read from and/or write to) the memory 126. For instance, the memory 126 may store images, inertial information, global positioning information, and/or instruction codes for performing operations by the processor 112. Examples of instructions and/or data that may be stored by the memory 126 may include pose information 128 (e.g., camera pose information, vehicle pose information, and/or electronic device 102 pose information, etc.), information from the inertial sensor(s) 114, information from the global positioning receiver 122, inertial information, acceleration information, velocity information, orientation information, gyro information, global positioning information (e.g., GPS measurements), global positioning velocity information, error metric information, image information, object detection information, object location information, 2D object location information (e.g., pixel data), feature points, key points, corners, object mapping information, and/or 3D object location information, etc., image obtainer instructions, inertial sensor 114 instructions, global positioning receiver 122 instructions, perception module 116 instructions, positioning module 118 instructions, VIO module 120 instructions, and/or instructions for one or more other elements, etc.

In some configurations, the electronic device 102 may include an image data buffer (not shown). The image data buffer may buffer (e.g., store) image information from the image sensor(s) 104 and/or external camera(s). The buffered image information may be provided to the processor 112.

In some configurations, the electronic device 102 may include one or more displays 132. In some approaches, images (e.g., scenes and/or objects) that are being captured by the image sensor(s) 104 may be presented on the display 132. For example, one or more images from the camera(s) mounted on a vehicle may be sent to the display(s) 132 in a dashboard for viewing by a user. In some configurations, these images may be played back from the memory 126, which may include image information of an earlier captured scene. The one or more images obtained by the electronic device 102 may be one or more video frames and/or one or more still images. For example, the display(s) 132 may be configured to output a view of one or more objects (e.g., signs, lane markers, landmarks, etc.).

The display(s) 132 may be integrated into the electronic device 102 and/or may be coupled to the electronic device 102. For example, the electronic device 102 may be a virtual reality headset with integrated displays 132. In another example, the electronic device 102 may be a computer that is coupled to a virtual reality headset with the displays 132. In yet other examples, the electronic device 102 may be a vehicle or may be included in (e.g., integrated into) a vehicle.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In some configurations, one or more of the images described herein may be presented on the display 132 and/or user interface 134. In some configurations, the user interface 134 may enable a user to indicate preferences (e.g., view settings) and/or interact with the view. For example, the user interface 134 may receive one or more commands for starting a navigation application on the electronic device 102 that uses global positioning information (e.g., GPS and/or GNSS data) in a VIO system.

In some configurations, the electronic device 102 (e.g., processor 112) may optionally be coupled to, be part of (e.g., be integrated into), include, and/or implement one or more kinds of devices. For example, the electronic device 102 may be implemented in a vehicle equipped with one or more cameras. In another example, the electronic device 102 may be implemented in a drone equipped with one or more cameras. In other examples, the electronic device 102 (e.g., processor 112) may be implemented in a server or a smart phone.

The electronic device 102 may include one or more inertial sensors 114. The inertial sensor(s) 114 may provide inertial information (e.g., acceleration information and/or orientation information). For example, the inertial sensor(s) 114 may detect (e.g., sense) motion (e.g., acceleration)

and/or orientation. In some configurations, the inertial sensor(s) 114 may include one or more accelerometers and/or one or more gyroscopes. The accelerometer(s) may detect acceleration in one or more directions (e.g., along one or more axes). The gyroscope(s) may detect orientation. For example, the gyroscope(s) may determine roll, pitch, and/or yaw values. In some implementations, the inertial sensor(s) 114 may provide three-dimensional (3D) accelerometer information and 3D gyroscope information at a particular frequency (e.g., 200 hertz (Hz)). In some configurations, the inertial sensor(s) 114 may be an inertial measurement unit (IMU).

The electronic device 102 may include a global positioning receiver 122. The global positioning receiver 122 may determine global positioning information (e.g., GPS data, GNSS data, GPS velocity, etc.). For example, the global positioning receiver 122 may receive one or more signals from one or more satellites that enable the global positioning receiver 122 to determine (e.g., estimate) a position of a receiving antenna (e.g., GPS antenna). In some implementations, satellites may include a system of transmitters positioned to enable entities to determine their location on or above the Earth based, at least in part, on signals received from the transmitters. For example, a transmitter may transmit a signal marked with a repeating pseudo-random noise (PN) code of a set number of chips and may be located on ground-based control stations, user equipment, and/or space vehicles. In a particular example, transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for a satellite positioning system (SPS). For example, the techniques provided herein may be applied to or otherwise be enabled for use in various regional systems and/or various augmentation systems (e.g., a Satellite Based Augmentation System (SBAS)) that may be associated with or otherwise be enabled for use with one or more global and/or regional navigation satellite systems.

The global positioning receiver 122 may determine global positioning information. The global positioning information may include one or more kinds of information. For example, the global positioning information may indicate one or more pseudoranges, one or more carrier phases, and/or a position (relative to the Earth) of a GPS antenna, and/or a GPS velocity (e.g., a GPS velocity relative to Earth). The GPS velocity may indicate a speed and/or heading of an antenna (e.g., GPS antenna coupled to the global positioning receiver 122). In some configurations, the global positioning information may include an error metric. The error metric may indicate a degree of certainty (or uncertainty) in the GPS velocity. The global positioning information may be determined and/or provided at a particular rate. For example, the global positioning information may be determined and/or provided at 1 hertz (Hz), 5 Hz, 10 Hz, etc.

It should be noted that in some approaches, determining a position may require a number of pseudoranges and/or carrier phases. For example, to determine a position directly, four satellite pseudoranges may be utilized. In some cases, four satellite pseudoranges (e.g., four reliable pseudoranges) may not be concurrently available. For example, when the electronic device 102 is located in a location with one or more obstructions, multipath may degrade pseudorange measurements, which may lead to an inaccurate and/or unreliable position determination (e.g., position fix).

In some configurations, the global positioning receiver 122 determines position (e.g., antenna position) and/or GPS velocity. For example, The GPS velocity may be computed by a global positioning receiver (e.g., GPS/GNSS receiver). In some implementations, the global positioning receiver may be a real-time GNSS receiver implementation in open-source code. In some approaches, the GPS velocity may be determined from Doppler measurements in the global positioning receiver. In some configurations, the global positioning receiver may determine the GPS velocity at a particular rate (e.g., a rate of 5 Hz that is greater than a 1 Hz rate).

The GPS velocity may indicate a speed and/or a direction of the electronic device 102. In some configurations, the electronic device 102 may also determine an error metric (e.g., quality metric) associated with the GPS velocity. The error metric may represent uncertainty of the GPS velocity vector along each of one or more axes (e.g., orthogonal axes). For example, the global positioning receiver 122 may determine and/or provide the error metric using satellite geometry and/or a signal-to-noise ratio (SNR) of the GPS carrier signal.

When used in conjunction with VIO, relative displacements may be utilized to combine pseudoranges (e.g., pseudorange measurements) taken at different times. For example, one or more of a number of pseudoranges obtained over time may be adjusted (e.g., transformed) based on the relative displacements in order to combine (e.g., compress) the pseudoranges such that the pseudoranges may be utilized to determine a position (e.g., position fix). For instance, one or more relative displacements may be combined with one or more prior pseudoranges in order to transform (e.g., propagate) the prior pseudoranges to a current time. In some configurations of the systems and methods disclosed herein, one or more outliers (e.g., unreliable pseudoranges) may be removed in order to enable determining an accurate position based on a set of pseudoranges.

The processor 112 may be configured to implement one or more of the methods disclosed herein. For example, the processor 112 may be configured to use global positioning information (e.g., GPS data, GNSS data, GPS velocity, etc.) with VIO.

The processor 112 may include and/or implement an image obtainer in some configurations. One or more image frames may be provided to the image obtainer. For example, the image obtainer may obtain images from one or more cameras (e.g., normal cameras, wide-angle cameras, fisheye cameras, stereoscopic cameras, etc.). For example, the image obtainer may receive image information from one or more image sensors 104, from one or more external cameras, and/or from one or more remote cameras (e.g., remote vehicle cameras). The images may be captured from one or multiple cameras (at different locations, for example). As described above, the image(s) may be captured from the image sensor(s) 104 included in the electronic device 102 or may be captured from one or more remote camera(s).

In some configurations, the image obtainer may request and/or receive one or more images. For example, the image obtainer may request and/or receive one or more images from a remote device (e.g., external camera(s), remote server(s), remote electronic device(s), remote vehicle(s), etc.) via the communication interface 108.

In some configurations, the processor 112 may include a perception module 116 and/or a positioning module 118. The output (e.g., one or more frames) of the image sensor(s) 104 (e.g., camera), inertial sensor(s) 114 (e.g., IMU), and/or global positioning receiver 122 (e.g., GPS) may be provided to the perception module 116 and/or the positioning module 118.

The perception module 116 may detect one or more objects based on one or more images (e.g., image information, image frames, video, etc.). For example, the perception module 116 may detect one or more landmarks in an incoming video stream. The perception module 116 may locate (e.g., localize) the object(s) in the images. The perception module 116 may provide perception information. For example, the perception information may include object (e.g., landmark) detection information (e.g., object features, object keypoints, object type, etc.), object location information, object pose information, etc.

In some implementations, the perception module 116 may detect and/or locate landmarks such as signs and lane markers. For example, the perception module 116 may include sign and lane marker modules (not shown) to detect signs and lanes in image frames as landmarks. In some configurations, the sign module may perform detection, tracking, and fitting (e.g., fitting data to a model, such as a sign shape). Additionally or alternatively, the lane marker module may perform lane marker detection and spatio-temporal analysis (e.g., tracking across multiple frames).

The positioning module 118 may determine pose information (e.g., camera pose information, electronic device 102 pose information, vehicle pose information, etc.). For example, the positioning module 118 may determine pose information based on visual, inertial, and global positioning information (e.g., by integrating visual, inertial, and GPS/GNSS inputs). For instance, the image sensor(s) 104 (and/or image obtainer, for example) may provide image information to the positioning module 118, the inertial sensor(s) 114 may provide inertial information to the positioning module 118, and/or the global positioning receiver 122 may provide global positioning information to the positioning module 118. The pose information may indicate a location (e.g., position) and/or orientation. For example, the pose information may indicate a location and/or orientation of a camera, of the electronic device 102, of a vehicle, etc. In some configurations, the pose information may be relative to the Earth (e.g., in Earth coordinates, World Geodetic System 1984 (WGS84) coordinates, Earth-centered Earth-fixed (ECEF) coordinates, east north up (ENU) coordinates, etc.).

In some configurations, the positioning module 118 may include a visual inertial odometry (VIO) module 120. The VIO module 120 may determine pose information based on VIO. For example, the VIO module 120 may utilize perception information (e.g., object features, object location information, etc.), image information, inertial information, and/or global positioning information to determine pose information. For example, the positioning module 118 may provide estimates of camera poses (in 6 DOF, for example) by fusing GPS information (e.g., from the global positioning receiver 122), inertial sensor 114 inputs and image sensor 104 (e.g., camera video) inputs.

In some configurations, the VIO module 120 may include a Kalman filter (e.g., an extended Kalman filter (EKF)). The Kalman filter (e.g., EKF) may include one or more rotation states and/or one or more translation states. The rotation state(s) and/or translation state(s) may indicate a pose (e.g., camera pose, electronic device 102 pose, vehicle pose, etc.). The pose may indicate a location (e.g., position) and/or orientation. An "instantaneous" pose may refer to a pose determined by the Kalman filter corresponding to a current epoch (e.g., GPS epoch). In some approaches, the Kalman filter may be updated at each epoch.

In some configurations, the Kalman filter (e.g., EKF) may include one or more additional states. For example, the Kalman filter (e.g., EKF) may include one or more states corresponding to one or more prior epochs (e.g., GPS epochs). A "prior" pose may refer to one or more prior poses at one or more corresponding prior epochs (e.g., GPS epochs). In some configurations, the number of prior epochs (e.g., prior poses, prior pose states, etc.) may be fixed. For example, a Kalman filter may have states for a current epoch and for two or more prior epochs. An epoch may be a measure of time. In some approaches, each epoch may relate to global positioning measurements. For example, different global positioning measurements may correspond to different epochs.

The term "sliding window" may refer to a period of time that includes multiple epochs. As time progresses, the sliding window may include different epochs. For example, assume four epochs in sequence: epoch A, epoch B, epoch C, and epoch D. When epoch C is the current epoch, the sliding window may include epoch A, epoch B, and epoch C. When epoch D is the current epoch, the sliding window may include epoch B, epoch C, and epoch D. Accordingly, one or more prior epochs may exit the sliding window as one or more epochs enter the sliding window. The Kalman filter may operate based on the epochs that are currently included within the sliding window. For example, the states of the Kalman filter may correspond to the epochs within the sliding window.

The VIO module 120 may update the Kalman filter (e.g., EKF state(s)), where the Kalman filter includes a current pose (of a camera, of the electronic device 102, of a vehicle, etc., for example) and a sliding window of multiple prior poses using measurements (e.g., pseudoranges) up to a current epoch. For example, the sliding window of multiple prior poses may include poses (of a camera, of the electronic device 102, of a vehicle, etc., for example) at a number of (e.g., N) GPS epochs. In some configurations, the number of GPS epochs may include a number of most recent GPS epochs.

In some configurations, the state definition of the Kalman filter with GPS sliding window poses in VIO may be expressed as $X=\{X_{nav}, X_{cal}, X_{sw}, X_{map}, X_{gpsSW}\}$, where $X_{gpsSW}=\{T_{sb0}, R_{sb0}, \ldots, T_{sbM}, R_{sbM}\}$ may include M past poses at GPS epochs. In the state definition, $X_{nav}$ may denote the pose (e.g., current estimate) of the body (e.g., vehicle, rover, device, etc.) frame with respect to the spatial frame (in translation, rotation, velocity, and/or gravity vector, for example). $X_{nav}$ may include accelerometer and gyro biases. $X_{cal}$ may include a scale factor for an accelerometer and gyro. $X_{cal}$ may include axis misalignment for accelerometer and gyro. In some configurations, $X_{cal}$ may include a rotation between the gyro frame and accelerometer frame, translation between the camera frame and accelerometer frame, and/or rotation between the camera frame and accelerometer frame. $X_{sw}$ may include a number (e.g., n) of previous body poses at one or more frames (e.g., key frames taken when a threshold amount of translation and/or rotation have occurred). It should be noted that sw may denote the "sliding window." $X_{map}$ may include 3D feature locations (e.g., x, y, and z coordinates of the features). $X_{gpsSW}$ may include a number (e.g., M+1) of translation and rotation values, where $T_{sb}$ may denote the translation of a body frame with respect to the spatial frame and where $R_{sb}$ may denote the rotation of a body frame with respect to the spatial frame. The "body frame" may be a frame corresponding to a device (e.g., vehicle, rover, etc.).

Updating the Kalman filter (e.g., EKF) may include updating a covariance matrix for the prior poses and the current pose (in the overall EKF state, for example). For example, the Kalman filter may include one or more covariance matrixes corresponding to one or more relative displacements. A covariance matrix may include and/or indicate the individual variance of each of the states (e.g., poses) along diagonal terms. The off-diagonal terms may indicate covariance between the entries (e.g., states, poses, etc.). For example, the covariance matrix is a matrix that defines the error estimate of each of the variables. Each of the diagonal elements in the covariance matrix may indicate the variance of a particular element itself and the cross-diagonal elements may indicate the cross-correlation of each element with respect to another element.

The VIO module 120 may determine (at each epoch, for example) one or more relative displacements. For example, the VIO module 120 may determine the relative displacements between epochs. In some approaches, the VIO module 120 may determine relative displacements between each prior pose (e.g., updated prior pose) and the current pose. Additionally or alternatively, the VIO module 120 may determine relative displacements between each pair of epochs. Between epochs, for example, the VIO module 120 may utilize the image information and/or the inertial information to determine a relative displacement (e.g., the movement of the electronic device 102 between epochs).

There may be several potential approaches to compute relative displacements. In some configurations, the VIO module 120 may use a difference of translation estimates. An example of a difference of translation estimates is given in Equation (1).

$$\Delta T = T_{sb}(N) - T_{sb}(N-1) \quad (1)$$

In Equation (1), $T_{sb}(N)$ denotes a translation estimate of a body frame with respect to the spatial frame at epoch N. Large jumps may be caused due to additional measurement information $y_N$ now obtained to provide estimate of $T_{sb}(N)$. In particular, large jumps in $\Delta T$ may potentially occur due to measurement information $y_N$ as expressed in Equation (2) and Equation (3).

$$T_{sb}(N-1) = E\{T_{sb}|y_0, y_1, \ldots, y_{N-1}\} \quad (2)$$

$$T_{sb}(N) = E\{T_{sb}|y_0, y_1, \ldots, y_{N-1}, y_N\} \quad (3)$$

In Equations (2) and (3), y may denote measurements (e.g., measurements based on the image sensor(s) 104 and/or the global positioning receiver 122 such as GPS velocity) received by the Kalman filter. It should be noted that $T_{sb}(N)$ and $T_{sb}(N-1)$ may be tightly correlated. Accordingly, any correction in $T_{sb}(N)$ may imply a correction in $T_{sb}(N-1)$. Accordingly, relative displacements may be computed as expressed in Equation (4).

$$\Delta T = E\{T_{sb}(N) - T_{sb}(N-1)|y_0, y_1, \ldots, y_{N-1}, y_N\} \quad (4)$$

This may be achieved through a sliding window that properly accounts for correlation (e.g., smoothed data).

The VIO module 120 may determine an error covariance of each of the relative displacements based on cross-covariances between each of the prior poses (e.g., updated prior poses) and the current pose in the covariance matrix (e.g., EKF covariance matrix). For example, an EKF covariance matrix may be updated based on updated prior poses and the current pose.

The positioning module 118 may use the relative displacements and the error covariances to fuse pseudorange measurements taken over multiple epochs. For example, the positioning module 118 may combine pseudorange measurements taken over (e.g., at) multiple epochs to determine pose information (e.g., position and/or orientation of the electronic device 102).

The positioning module 118 may obtain pseudorange measurements from the global positioning receiver 122. In some configurations, the tropospheric, ionospheric, and satellite clock biases may be assumed to be corrected in these pseudorange measurements either through standard models used in single-point solutions or from network data. The corrected pseudorange measurements may be modeled as illustrated in Equation (5).

$$\rho_s(t) \triangleq \|x(t) - x_s(t)\| + b(t) + v_s(t) + z_s(t) \quad (5)$$

where x(t) is the mobile platform position, $x_s(t)$ is the satellite position, b(t) is the receiver clock bias, $v_s(t) \geq 0$ is the non-line-of-sight (NLOS) noise, and $z_s(t)$ captures multipath and receiver noise with standard deviation σ. It should be noted that line-of-sight (LOS) may mean that a transmitter (e.g., satellite) has a direct (e.g., unobstructed) path to a receiver. NLOS may mean that a transmitter (e.g., satellite) does not have a direct path to a receiver. The NLOS noise may result from blockages and reflections from buildings that are far away and the multipath noise may be due to local reflections. In some configurations, the pseudorange measurements with nonzero NLOS noise $v_s(t) > 0$ may be outlier range-rate measurements. For example, pseudorange measurements for nonzero NLOS noise may be removed as outliers.

In some configurations, the systems and methods described herein may recursively apply a Random Sample and Consensus (RanSaC) approach to determining outliers and/or a position of the mobile platform. Thus, the positioning module 118 may track past tentative positions as well as their corresponding pseudorange measurements. The past tentative positions may be derived by the positioning module 118 performing processing at previous time epochs. The pseudorange measurements associated with the past tentative positions may be pseudorange measurements that are line-of-sight (LOS) consistent with the past tentative positions (e.g., these pseudorange measurements may constitute the consensus set in RanSaC terminology).

Next, the positioning module 118 may determine a displacement of the electronic device 102 (e.g., mobile platform) between a current time epoch and a previous time epoch based on the relative displacements provided by the VIO module 120. For example, since x(t) is the position of the electronic device 102 (e.g., mobile platform) at GPS time epoch t, the displacement between two GPS time epochs t−1 and t may be given by Equation (6).

$$\Delta x(t-1) \triangleq x(t) - x(t-1) \approx \hat{R}^T(T_{sb}(t) - T_{sb}(t-1)) \quad (6)$$

In Equation (6), $\hat{R}$ is a rotation matrix relating the GPS global reference frame and the VIO local reference frame, and $T_{sb}(t)$, $T_{sb}(t-1)$ denote VIO estimates of the pose of the device at GPS epochs t, (t−1) that are also states within the sliding GPS window.

The positioning module 118 may compute a coarse position estimate $\tilde{x}(t)$ of x(t) from a set of pseudoranges (e.g., all pseudoranges, including possibly NLOS-noise corrupted pseudoranges). The coarse position estimate may be assumed to be within 200 meters from the true position. Using this coarse position, the positioning module 118 may approximate the distance between the electronic device 102 (e.g., mobile platform) and the satellite s in accordance with Equations 7 and 8.

$$\|x(t) - x_s(t)\| \approx \|\tilde{x}(t) - x_s(t)\| + \nabla_s^T(t)(x(t) - \tilde{x}(t)) \quad (7)$$

where $$\nabla_s(t) \triangleq \frac{(\tilde{x}(t) - x_s(t))}{\|(\tilde{x}(t) - x_s(t))\|} \quad (8)$$

is the unit vector from the satellite s to the coarse estimate $\tilde{x}(t)$ of the electronic device 102 (e.g., mobile platform) position $x(t)$.

T may be the current time epoch and it may be assumed that the positioning module 118 has access to all pseudorange measurements from time epochs t in the window $\{T-W+1, T-W+2, \ldots T\}$ of size W. The positioning module 118 may have access from the VIO GPS sliding window to measurements of the displacement $\Delta x(t-1)$ between time epochs $t-1$ and $t$ as defined above in Equation (6). Since these VIO displacements are accurate for a properly chosen window size W, the positioning module 118 may ignore any noise in them and may assume to have access to the displacements $\Delta x(t-1)$ directly. Using these displacements, the positioning module 118 may propagate forward the pseudorange measurements from past (prior) time epochs $t<T$ to time T. Thus, $$x(t) = x(T) - \sum_{\tau=t}^{T-1} \Delta x(\tau) \quad (9)$$

so that $$\nabla_s^T(t)(x(t) - \tilde{x}(t)) = \nabla_s^T(t)\left(x(T) - \sum_{\tau=t}^{T-1} \Delta x(\tau) - \tilde{x}(t)\right) \quad (10)$$

The modified pseudorange measurement may be defined as shown in Equation (11).

$$y_s^{(T)}(t) \triangleq \rho_s(t) - \|\tilde{x}(t) - x_s(t)\| + \nabla_s^T(t)\left(\sum_{\tau=t}^{T-1} \Delta x(\tau) - \tilde{x}(t)\right) \quad (11)$$

Equation (12) may follow as $$y_s^{(T)}(t) \approx \nabla_s^T(t)x(T) + b(t) + v_s(t) + z_s(t) \quad (12)$$

for all time epochs t and all satellites s. This modified pseudorange measurement $y_s^{(T)}(t)$ at the time $t \in \{T-W+1, T-W+2, \ldots T\}$ provides information about the position $x(T)$ at the current time epoch T. The following further description may utilize these modified pseudorange measurements. Furthermore, as mentioned above, the positioning module 118 may track a number of tentative positions, which each provide an estimate of the current position $x(T)$, which may be referred to herein as $\hat{x}(T)$.

The positioning module 118 may propagate the past tentative positions and modified pseudorange measurements within a window W. Each tentative position $\hat{x}(T-1)$ may be propagated in accordance with Equation (13).

$$\hat{x}(T) = \hat{x}(T-1) + \Delta x(T-1) \quad (13)$$

For each $t \in \{T-W+1, T-W+2, \ldots T-1\}$ and each satellite s, the modified pseudorange measurement $y_s^{(T-1)}(t)$ as used in the previous time epoch T-1 may be propagated in accordance with Equation (14).

$$y_s^{(T)}(t) = y_s^{(T-1)}(t) + \nabla_s^T(t)\Delta x(T-1) \quad (14)$$

The positioning module 118 may discard one or more current pseudorange measurements corresponding to the current time epoch if the one or more current pseudorange measurements are not line-of-sight (LOS) consistent with any of the propagated tentative positions. This consistency check may make use of the property that NLOS noise is assumed to be in a range (e.g., [0,200] m).

For example, assume that satellite s is LOS at time epoch T, then, with high probability, there exists a position $\hat{x}(T)$ and a clock bias $\hat{b}(T)$ satisfying:

$$y_s^{(T)}(t) \in \nabla_s^T(t)\hat{x}(T) + \hat{b}(T) \pm \kappa\sigma,$$

$$y_{s'}^{(T)}(t) \geq \nabla_{s'}^T(t)\hat{x}(T) + \hat{b}(T) - \kappa\sigma, \forall s' \neq s$$

$$y_{s'}^T(t) \leq \nabla_{s'}^T(t)\hat{x}(T) + \hat{b}(T) + 200 + \kappa\sigma, \forall s' \neq s$$

$$x(T) \in \tilde{x}(T) \pm 200 \quad (15)$$

In Equation (15), the addition/subtraction $\tilde{x}(T) \pm 200$ is understood to be component-wise, and $\kappa$ is a fixed parameter in the interval [1, 5]. In Equation (15), the first inequality enforces that satellite s is LOS, the second and third inequalities enforce that for all other satellites s' the NLOS noise is in [0, 200] m, and the last inequality enforces that the position is within 200 m of a coarse position estimate $\tilde{x}(T)$. It should be noted that although the value 200 and the interval [1, 5] are given as examples, a different value and/or interval may be utilized. In Equation (15), a may be a standard deviation of multipath receiver noise.

In some approaches, the above-noted set of inequalities may be expressed as a linear program in the unknowns $\hat{x}(T)$ and $\hat{b}(T)$. Feasibility of this linear program can be computed efficiently using, for example, the simplex method. If there exists no solution $(\hat{x}(T), \hat{b}(T))$ to this linear program, then with high probability the satellite s cannot be LOS, and the corresponding pseudorange measurement can be discarded.

In some configurations, the positioning module 118 may weight inlier pseudorange measurements using the error covariances of the relative displacements. For example, the positioning module 118 may determine weighting factors based on the error covariances. For instance, higher weighting factors may correspond to lower covariances, and lower weighting factors may correspond to higher covariances. The weighting factors may be applied to the inlier pseudoranges. The inlier pseudoranges may be the pseudoranges remaining after outlier pseudoranges are discarded or removed. From Equation (12), the modified pseudorange measurement for a LOS satellite at GPS epoch t in terms of the device position at the current GPS epoch T may be given by $y_s^{(T)}(t) \approx \nabla_s^T(t)x(T) + b(t) + z_s(t)$ (e.g., the $v_s(t)$ may be omitted with a LOS assumption). This may assume that the relative displacement computed from the VIO module's GPS sliding window states corresponding to GPS epochs t and T are exact (where t is an epoch relative to the current epoch T, for example). The error covariance of the relative displacement $\Delta \triangleq x(T) - x(t)$ may be computed from the appropriate block matrices (e.g., $P_{x(T),x(T)}$, $P_{x(t),x(t)}$, and $P_{x(T),x(t)}$) within the EKF covariance matrix. For example, the error covariance may be computed with subsets of the EKF covariance matrix (e.g., error covariance for T, error covariance for t, and/or error covariance for T in relation to t). This is a consequence of adding the GPS sliding window states as additional states in the EKF. The error variance of $\Delta x$, which may be computed as $P_{x(T),x(T)} + P_{x(t),x(t)} - 2 \times P_{x(T),x(t)}$, scaled by $\nabla_s^T(t)$, may be modeled as additive noise to $z_s(t)$. In effect, this additive component may be considered as weighting of each LOS pseudorange measurement based on the error statistics of the VIO module's relative displacement estimates.

In some configurations, the positioning module 118 may determine an absolute position fix using inlier pseudorange measurements. For example, the positioning module 118 may compute an absolute position fix of the electronic device 102 using the inlier pseudorange measurements.

In some configurations, the electronic device 102 may utilize one or more inter-epoch camera poses. For example, VIO may update at a higher rate than global positioning information in some approaches. For instance, the inter-epoch camera poses may be utilized to propagate the electronic device 102 position from a last epoch (e.g., between epochs).

In some configurations, the electronic device 102 (e.g., VIO module 120) may determine whether to update the Kalman filter (e.g., EKF) and/or may determine the sliding window based on a distance moved (and/or whether to insert a GPS measurement based on an amount of distance traveled). For example, if the electronic device 102 is stationary or moving very little, it may be beneficial to delay updating the Kalman filter (e.g., skip one or more GPS epoch updates) until the electronic device 102 has moved a threshold distance. This may help to de-correlate the poses (e.g., Kalman filter states) and improve accuracy. In some approaches, the electronic device 102 may utilize inertial information and/or image information (e.g., VIO information) to determine whether the electronic device 102 (e.g., vehicle) has moved a threshold distance. If the electronic device 102 has moved a threshold distance, the VIO module 120 may update the Kalman filter at the next GPS epoch. If the electronic device 102 has not moved the threshold distance, the VIO module 120 may delay updating the Kalman filter (e.g., skip one or more GPS epoch updates). In some approaches, the Kalman filter may be updated and distance information may be utilized to determine if the epoch needs to be added to the GPS sliding window. For example, in a case that the electronic device 102 has moved a threshold distance, the GPS epoch may be added to the GPS sliding window. Otherwise, the GPS epoch may not be added.

In some configurations, the electronic device 102 may control a vehicle based on the pose information (e.g., final fused position information). For example, the pose information may be utilized in VIO and GPS fusion to produce fused position information, which may indicate a position of a vehicle relative to a coordinate system and/or map. The accuracy of the fused position information may be improved due to the application of the sliding window. For example, the systems and methods disclosed herein may improve consistency in position estimates (e.g., improve outlier rejection, improve estimation smoothness, etc.). The electronic device 102 may control the vehicle position based on the fused position by controlling the vehicle to track a route to a destination in the coordinates and/or map, for example. The systems and methods disclosed herein (e.g., use of a sliding window, for example) may additionally or alternatively be beneficial by enabling the use of less costly equipment for navigation.

In some configurations, the outputs of the perception module 116 and the positioning module 118 may be aggregated and sent to a mapping algorithm in the cloud, which may generate a location estimate of one or more landmarks in a global frame. For example, one or more mapping algorithms in the cloud (e.g., on one or more network devices, remote servers, etc.) may detect and/or localize landmarks to generate a localization map.

In some configurations, one or more of the following frames (e.g., coordinate systems) may be defined and/or utilized. A global frame may be denoted as "e" in some approaches. For example, the global frame e may be ECEF in WGS84. A local frame (or VIO spatial frame) may be denoted as "s" in some approaches. For example, the local frame s may be an Earth-fixed frame with arbitrary origin (in translation, for example) and orientation. One or more body frames may be defined and/or utilized in some approaches. One example is a vehicle body frame that may be denoted "a(t)". For instance, the vehicle body frame a(t) may be fixed to a vehicle, with an origin at an antenna center of phase, oriented along the vehicle with x-right, y-forward, and z-up. Another example is a camera frame that may be denoted "c(t)". For instance, the camera frame c(t) may be fixed to a vehicle, with an origin at camera center, while facing forward, oriented with x-right, y-down, and z-forward. Another example is an accelerometer frame that may be denoted "b(t)". For instance, the accelerometer frame b(t) may be fixed to the accelerator in an IMU sensor embedded in a sensor sync board. Another example is a gyroscope frame that may be denoted "g(t)". For instance, the gyroscope frame g(t) may be fixed to the gyroscope in an IMU sensor embedded in a sensor sync board. A ground truth GPS related frame (e.g., GT GPS IMU frame) may be defined and/or utilized in some configurations. It should be noted that one or more other frames and/or coordinate system definitions may be used in addition to or alternatively from one or more of the foregoing frames described.

It should be noted that one or more of the elements or components of the electronic device 102 may be combined and/or divided. For example, the perception module 116, the positioning module 118, and/or the VIO module 120 may be combined. Additionally or alternatively, the perception module 116, the positioning module 118, and/or the VIO module 120 may be divided into elements or components that perform a subset of the operations thereof.

It should be noted that one or more of the elements or components described in connection with the processor 112 may be optional. For example, the electronic device 102 may or may not include and/or may or may not implement the image sensor(s) 104, optical system(s) 106, communication interface(s) 108, the inertial sensor(s) 114, the global positioning receiver 122, the perception module 116, the positioning module 118, and/or the VIO module 120 in some configurations. In some implementations, the perception module 116, the positioning module 118, and/or the VIO module 120 may be implemented as independent circuitry (not as part of a processor 112, for example). In some configurations, a group of electronic devices (e.g., a drone swarm, group of vehicles, etc.) may coordinate. For example, one or more electronic devices 102 may provide (e.g., send, transmit, etc.) data (e.g., image data, inertial data, global positioning data, etc.) to another electronic device (e.g., server, vehicle, etc.) that may determine pose information.

Figure 2:
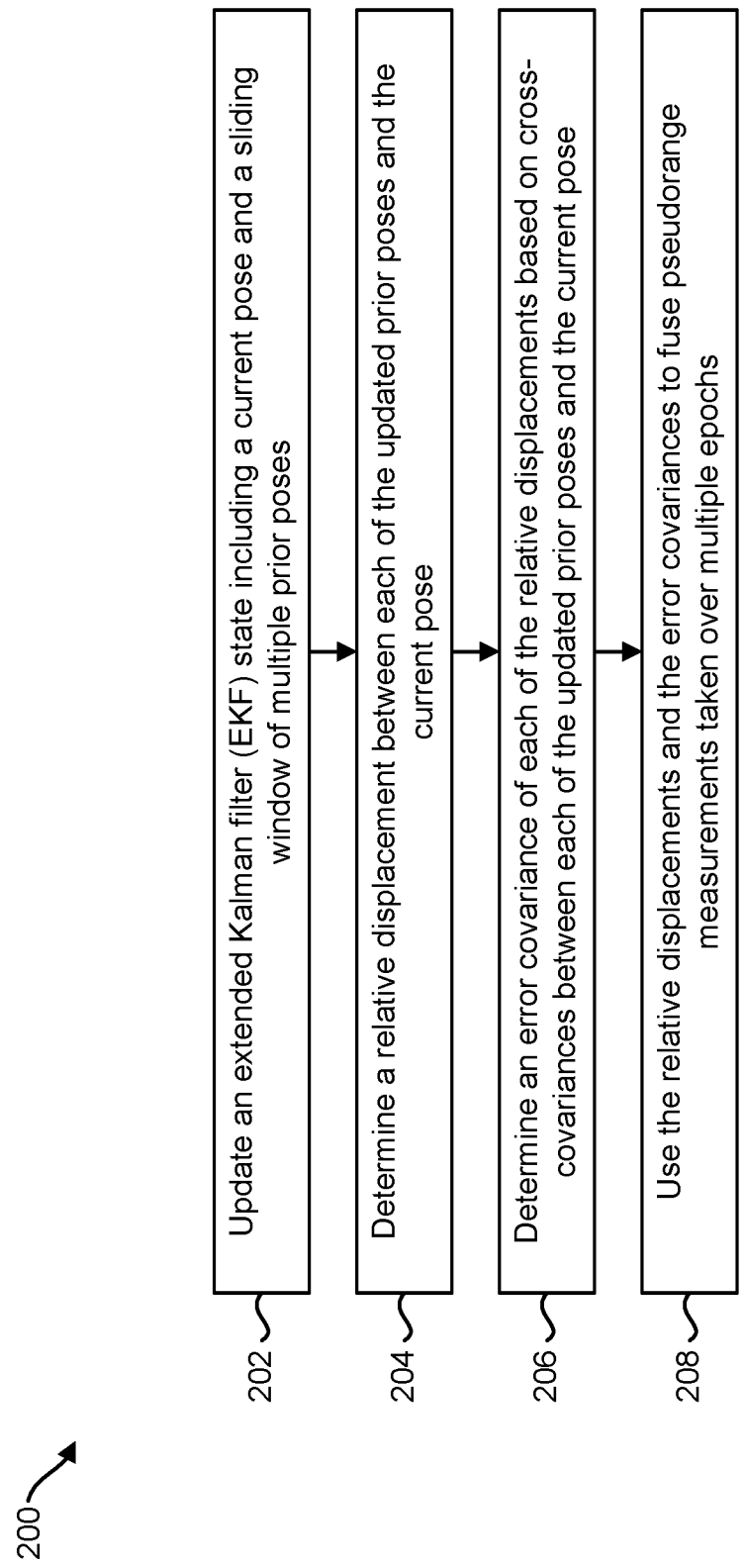
FIG. 2 is a flow diagram illustrating one configuration of a method for using a sliding window in VIO.

FIG. 2 is a flow diagram illustrating one configuration of a method 200 for using a sliding window in VIO. The method 200 may be performed by the electronic device 102 described in connection with FIG. 1. The electronic device 102 may update 202 a Kalman filter (e.g., an EKF) state including a current pose and a sliding window of multiple previous poses. This may be accomplished as described in connection with FIG. 1. For example, the sliding window of multiple prior poses may include poses at a number of most recent GPS time epochs. Updating the Kalman filter may include updating a covariance matrix for the prior poses and the current pose in the Kalman filter (e.g., EKF) state.

The electronic device 102 may determine 204, at GPS epoch (e.g., a current epoch), a relative displacement between each of the updated prior poses and the current pose. This may be accomplished as described in connection with FIG. 1. For example, the electronic device 102 (e.g., VIO module 120) may utilize visual information (e.g., observed object positions, feature points, and/or perception information over two or more frames) and/or inertial information (e.g., accelerometer information) to measure the relative displacement(s).

The electronic device 102 may determine 206 an error covariance of each of the relative displacements based on cross-covariances between each of the updated prior poses (e.g., updated prior poses) and the current pose. This may be accomplished as described in connection with FIG. 1.

The electronic device 102 may use 208 the relative displacements and the error covariances to fuse pseudorange measurements taken over multiple epochs. This may be accomplished as described in connection with FIG. 1. For example, the electronic device 102 may remove outlier pseudorange measurements from a set of pseudorange measurements based on the relative displacements between the updated prior poses and the current pose. Additionally or alternatively, the electronic device 102 may weight inlier pseudorange measurements using the error covariances of the relative displacements. Additionally or alternatively, the electronic device 102 may determine an absolute position fix using inlier pseudorange measurements.

In some configurations, the electronic device 102 may control a vehicle based on the pose information (e.g., absolute position fix). Additionally or alternatively, the pose information may be stored and/or transmitted. For example, the pose information may be transmitted to a remote device (e.g., cloud device, remote server, and/or one or more vehicles). The electronic device 102 and/or a remote device may utilize the pose information in generating and/or updating (e.g., refining) a map in some approaches.

Figure 3:
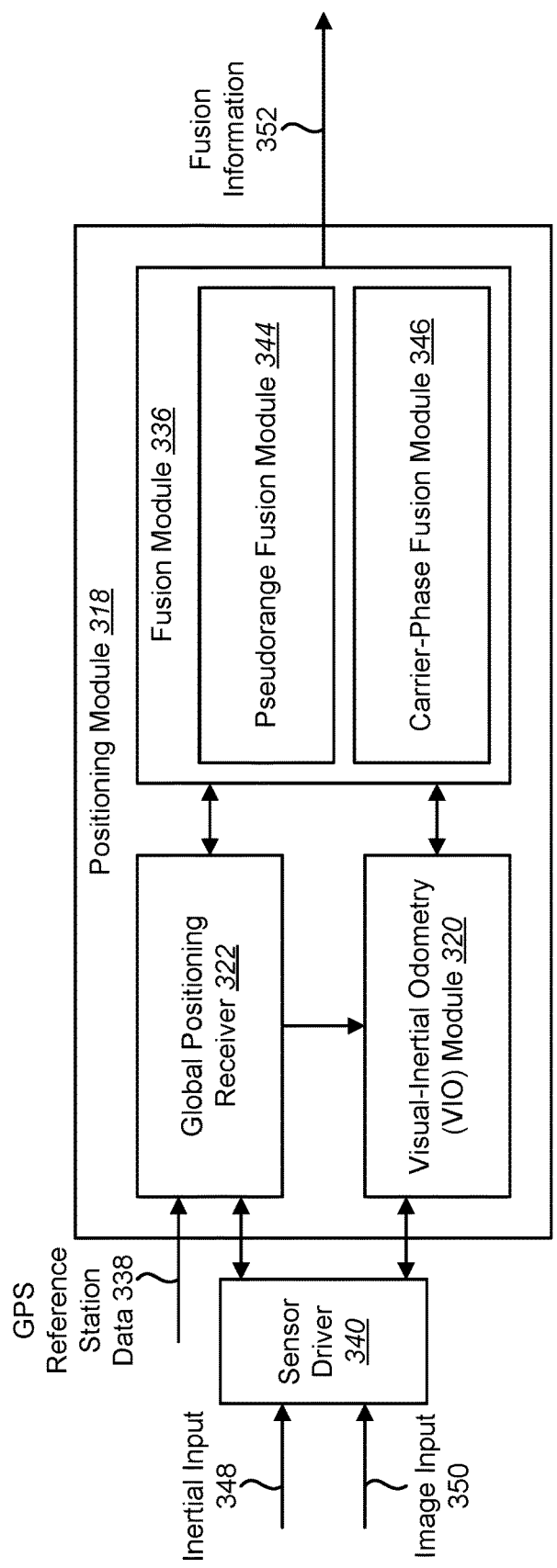
FIG. 3 is a block diagram illustrating one example of a positioning module that uses Global Positioning System (GPS)-aided visual-inertial odometry (VIO)

FIG. 3 is a block diagram illustrating one example of a positioning module 318 that uses Global Positioning System (GPS)-aided visual-inertial odometry (VIO). The positioning module 318 described in connection with FIG. 3 may be an example of the positioning module 118 described in connection with FIG. 1 in some configurations. As illustrated in FIG. 3, the positioning module 318 may include a global positioning receiver 322 (e.g., GPS/GNSS receiver), a VIO module 320, and/or a fusion module 336. It should be noted that the global positioning receiver 322 may be included in the positioning module 318 in some configurations or may be coupled to the positioning module 318 in some configurations. FIG. 3 illustrates an example of how the modules may be connected. As illustrated in FIG. 3, a sensor driver 340 may be coupled to the positioning module 318 in some configurations. The sensor driver 340 may be external to the positioning module 318 in some configurations (or may be included in the positioning module 318 in some configurations). For example, the sensor driver 340 may be implemented in the electronic device 102 of FIG. 1 in some configurations.

The sensor driver 340 may obtain an inertial input 348 and/or an image input 350. For example, the sensor driver 340 may receive measurements from one or more inertial sensors (e.g., IMU) and/or may receive a camera video input (via Universal Serial Bus (USB), for instance). The sensor driver 340 may provide image information and/or inertial information to the positioning module 318 (e.g., global positioning receiver 322 and/or VIO module 320).

It should be noted that the image information may take many forms. For example, the image information may include image data at Video Graphics Array (VGA) resolution (640×480) or Super VGA (SVGA) resolution, monochrome or color (8 bits or higher, for example), wide-angle or conventional lens, at a frame rate of 30 frames per second (fps), and/or with a timestamp in system time (e.g., time as measured at the electronic device 102). Other formats may be implemented and/or utilized.

The inertial information may include gyroscope information and/or accelerometer information (e.g., IMU information). The gyroscope and/or accelerometer may meet or exceed minimum quality requirements with respect to noise level, dynamic range etc. In some configurations, the inertial information may include one or more timestamps (in system time, for example) for gyroscope and/or accelerometer measurements. In some configurations, the sensor driver 340 may have one or more of the following capabilities: a capability to alter an inertial sensor low pass filter cutoff (e.g., cutoff frequency), a capability to access raw inertial samples, a capability to support a particular sample rate (e.g., sample rates of 200 Hz or higher), and/or a capability to provide support for temperature tables for one or more parameters (e.g., biases and/or scale factors). For example, temperature tables may be utilized to compensate for parameter variability based on temperature.

Additionally or alternatively, the sensor driver 340 may receive global positioning messages (e.g., GPS messages and timestamps) from a global positioning receiver, for example. The sensor driver 340 may provide global positioning (e.g., GNSS) measurements to the global positioning receiver 322 in some implementations. For example, the global positioning measurements may be provided at a particular update rate (e.g., 5 Hz). Additionally or alternatively, the sensor driver 340 may provide one or more other messages (e.g., a message for comparison, a message for computation of raw measurements and/or of non-smoothed measurements, and/or a message for carrier-phase GNSS fusion, etc.) to the positioning module 318.

In some configurations, the positioning module 318 may receive GPS reference station data 338. For example, the GPS reference station data 338 may include differential measurements from a reference station in a particular format. For instance, the global positioning receiver 322 may receive Radio Technical Commission for Maritime Services (RTCM) 104 v3.0 format messages within approximately 100 kilometers (km) for pseudorange GNSS fusion and approximately 10 km for carrier-phase GNSS fusion. The RTCM messages may include 1004 (GPS observables), 1019 (GPS broadcast ephemeris), 1006 (stationary reference station address resolution protocol and antenna height), and/or 1007 (antenna descriptor). The update rate for 1004 may be 1 Hz or higher. The periodicity for 1019, 1006, and/or 1007 may be every 30 seconds or better. It should be noted that other formats and/or message types may be utilized in some configurations.

The global positioning receiver 322 may be a real-time global positioning receiver (e.g., a GNSS receiver implementation in open-source code). In some configurations, the global positioning receiver 322 may be modified. For example, the global positioning receiver 322 may parse and process messages (e.g., SiRFBinary messages) and/or may utilize differential corrections from a reference station (e.g., GPS reference station data 338 from a modem). Further modifications may be made to the global positioning receiver 322 to provide corrected global positioning (e.g., GNSS) measurements to the fusion module 336.

The global positioning receiver 322 may provide one or more outputs. For example, the global positioning receiver 322 may provide corrected global positioning (e.g., GNSS) measurements per epoch. In some configurations, the global positioning receiver 322 may provide a GPS time (in seconds and/or fraction of a second, etc., for example) and/or number of satellites. For each satellite, the global positioning receiver 322 may provide a satellite identifier, satellite valid flag, satellite position (in ECEF (1×3) coordinates, for example), pseudorange, pseudorange variance, and/or SNR. Additionally or alternatively, the global positioning receiver 322 may provide a position and/or pose (e.g., camera position, vehicle position, and/or rover position in ECEF (1×3) coordinates), GPS velocity (in ECEF (1×3) coordinates, for example), and/or an error metric. One or more of the outputs may be provided to the VIO module 320 and/or to the fusion module 336. It should be noted that while the global positioning receiver 322 is illustrated as being included in the positioning module 318 in FIG. 3, the global positioning receiver 322 may alternatively not be included in the positioning module 318.

As described above, the VIO module 320 may receive image information and/or inertial information from the sensor driver 340. The VIO module 320 may receive the global positioning information (e.g., pseudoranges) from the global positioning receiver 322. For example, the VIO module 320 may receive a one or more pseudoranges at each GPS epoch. In some configurations, the VIO module 320 may obtain a system clock corresponding to GPS time epochs. For example, the VIO module 320 or another module may convert GPS time to a system clock time (e.g., may convert GPS time to time as measured by the electronic device 102). Additionally or alternatively, the VIO module 320 may receive a number (e.g., N) of past GPS epochs at which VIO output is provided. For example, VIO output may be provided at times when GPS measurements are obtained. The VIO module 320 may receive a system clock time at each of the epochs (e.g., past epochs).

The VIO module 320 may produce pose information (e.g., camera pose information, electronic device 102 pose information, and/or vehicle pose information, etc.). For example, the VIO module 320 may utilize the image information, the inertial information, and/or the global positioning information to determine the pose information.

For example, the VIO module 320 may produce one or more of the following outputs. The VIO module 320 may produce a corrected time stamp of a camera frame, a translation (e.g., a 3×1 vector) of the camera frame with respect to a spatial frame, a velocity (e.g., a 3×1 vector) of the camera frame with respect to the spatial frame, a gravity vector (e.g., a 3×1 vector) in the spatial frame, a rotation matrix (e.g., a 3×3 matrix) of the camera frame with respect to the spatial frame, an angular velocity (e.g., a 3×1 vector) of the camera frame with respect to the spatial frame, a covariance matrix (e.g., a 3×3 matrix) of the velocity vector of the camera frame with respect to the spatial frame, a covariance matrix (e.g., a 3×3 matrix) of the translation vector of the camera frame with respect to the spatial frame, a number of past GPS time epochs for which VIO output is also output, a past time epoch (k=1, 2, . . . , N) for which VIO output is provided, a translation (e.g., a 3×1 vector) for the camera frame with respect to spatial frame at past GPS time epoch k, a covariance matrix (e.g., a 3×3 matrix) of the translation vector of the camera frame with respect to the spatial frame at past GPS time epoch k, an identifier (ID) associated with current frame, and/or an uncorrected time stamp of the current frame. In some configurations, the VIO module 320 output may be at a particular rate (e.g., 30 fps). Additionally or alternatively, the VIO module 320 may provide an indicator of tracking failure and/or an indicator of any subsequent re-initialization.

In some configurations, the VIO module 320 may include a Kalman filter (e.g., EKF). In some configurations, within VIO, one or more mechanisms (e.g., relative displacement-based outlier rejection test) may be used to reject or de-weight the influence of an unreliable global positioning information. For example, the electronic device 102 may reject one or more pseudoranges based on the relative displacements.

In some configurations, the VIO module 320 may use an arbitrary fixed reference frame. For example, the reference frame for the VIO module 320 may be a spatial reference frame at time instant zero. The VIO module 320 may relate the spatial reference frame to the global positioning reference frame (e.g., a fixed frame of reference for the global positioning receiver 322). In some configurations, an initial relative misalignment determination (e.g., estimation) may be performed once (e.g., during initialization).

The fusion module 336 may receive global positioning information and/or VIO information. For example, the fusion module 336 may receive global positioning (e.g., GPS/GNSS) raw measurements (e.g., pseudorange, Doppler, and/or carrier phase) and/or visual-inertial odometry (VIO) information (e.g., from a relative positioning engine such as the VIO module 320). For instance, the fusion module 336 may receive corrected GNSS measurements from the global positioning receiver 122. The corrected GNSS measurements may include GPS time (in seconds and/or fractions of a second, etc.), and/or a number of satellites. For each satellite, the fusion module 336 may receive a satellite identifier, satellite valid flag, satellite position (in ECEF (1×3) coordinates, for example), pseudorange, pseudorange variance, and/or SNR.

Additionally or alternatively, the fusion module may receive position information (e.g., camera position, electronic device 102 position, vehicle position, rover position, and/or a 1×3 position vector in ECEF, etc.), velocity information (e.g., camera velocity, electronic device 102 velocity, vehicle velocity, rover velocity, and/or a 1×3 velocity vector in ECEF, etc.), and/or an error value (e.g., quality value). Additionally or alternatively, the VIO information may include relative measurements in a fixed, orthogonal, 3D frame of reference (the frame of reference may be arbitrary and unknown with respect to an Earth coordinate frame, for example) of a camera frame at an update rate of camera frames. For example, the VIO information may include a six degrees of freedom (6-DOF) pose, velocity, gravity, angular velocity, a camera frame identifier, GPS time (in seconds or a fraction of a second, for example) for a current pose, a translation (e.g., a 1×3 translation vector) of the camera frame with respect to a spatial frame, a velocity (e.g., a 1×3 velocity vector) of the camera frame with respect to the spatial frame, a gravity vector (e.g., a 1×3 gravity vector) in the spatial frame, a rotation matrix (e.g., a 3×3 rotation matrix) of the camera frame with respect to the spatial frame, an angular velocity (e.g., a 1×3 angular velocity vector) of the camera frame with respect to the spatial frame, a covariance matrix (e.g., a 3×3 covariance matrix) of the velocity vector of the camera frame with respect to the spatial frame, a covariance matrix (e.g., a 3×3 covariance matrix) of the translation vector of the camera frame with respect to the spatial frame, a number of past GPS time epochs for which the GPS/GNSS data is also output, a GPS time (in seconds and/or fractions of a second, for example) for a latest GPS epoch, a translation (e.g., a 1×6 translation vector) for the camera frame with respect to the spatial frame at a past GPS time epoch k, a covariance matrix (e.g., a 6×6 covariance matrix) of the translation vector of a camera frame with respect to a spatial frame at a past GPS time epoch k, and/or a frame ID associated with the current frame. In some configurations, the frame ID may be utilized to identify a frame in accordance with frame sequence, number, and/or time. Optionally, the VIO information may include a raw frame time stamp. In some configurations, the fusion module 336 may receive time stamps for global positioning (e.g., GNSS) measurements and/or VIO information (e.g., measurements) in a common global clock (e.g., GPS time).

The fusion module 336 may provide (e.g., output) fusion information 352. In some configurations, the fusion information 352 may include one or more of the following: global time (e.g., GPS time) and fusion pose information (e.g., camera pose, camera frame pose, electronic device 102 pose, vehicle pose, vehicle body frame pose, etc., in a 6 DOF ECEF coordinate frame). Additionally or alternatively, the fusion information 352 may include a frame ID. In some configurations, the fusion information 352 may include rotation information (e.g., a rotation matrix in ECEF coordinates) and/or translation information (e.g., a translation vector in ECEF coordinates).

The fusion module 336 may fuse global positioning measurements with relative positioning (e.g., VIO) to provide absolute positioning in one or more Earth coordinate frames. For example, GNSS fusion may refer to the fusion of GPS/GNSS raw measurements (e.g., pseudorange, Doppler, and/or carrier phase) with a relative positioning engine such as visual-intertial odometry (VIO) to provide absolute positioning in Earth coordinate frame(s). In some configurations, the fusion module 336 may have two input data interfaces (e.g., a global positioning receiver 322 input interface and a VIO module 320 input interface). The input interface(s) may provide one or more of the inputs (e.g., data elements) described above.

The fusion module may include a pseudorange fusion module 344 and/or a carrier-phase fusion module 346. In some configurations, fusion (e.g., GNSS fusion) may be divided into two stages (e.g., pseudorange fusion and carrier-phase fusion). The two stages may be performed by the pseudorange fusion module 344 and/or the carrier-phase fusion module 346.

The pseudorange fusion module 344 may utilize pseudorange and Doppler measurements (from a rover, for example) and corresponding differential corrections from a reference station. For example, the pseudorange fusion module 344 may perform pseudorange GNSS fusion. Pseudorange fusion (e.g., pseudorange GNSS fusion) may include one or more procedures and/or blocks. For example, post-processing of global positioning (e.g., GNSS) raw measurements may be performed first to compute one or more corrected pseudoranges, expected variance, satellite position, satellite velocity, and/or other additional information. Next, the positioning module 318 (e.g., pseudorange fusion module 344 (e.g., GNSS fusion) or other module) estimates the alignment of a global positioning (e.g., GPS) frame and a VIO frame (e.g., spatial frame) in an online manner. Next, outlier detection may be performed and position (e.g., camera position, electronic device 102 position, vehicle position, rover position, etc.) may be estimated.

In some configurations of the systems and methods disclosed herein, outlier detection may be performed as follows. It should be noted that outlier detection may be performed by the fusion module 336 (e.g., pseudorange fusion module 344) and/or one or more other modules (e.g., the VIO module 320). Pseudoranges may be corrupted by two noise sources: multipath due to local reflections (which may be modeled as a Gaussian random variable, for example) and non-line of sight (NLOS) noise resulting from blockages and/or reflections (which may be modeled as a nonnegative random variable, for example). For instance, the blockages and/or reflections may result from remote buildings and/or other obstructions. Pseudoranges with non-zero NLOS noise may be outliers and/or may be referred to as outliers.

Some examples of an outlier detection algorithm recursively apply a random sample consensus (RanSaC) approach. For instance, an outlier detection algorithm may keep track of a number of tentative positions (e.g., rover positions). Associated with each tentative position may be pseudoranges that are LOS-consistent with the position (e.g., constituting a consensus set in RanSaC terminology). The tentative position with the largest number of associated LOS-consistent pseudoranges may be selected as the final position estimate.

For each epoch, an outlier detection algorithm may perform (e.g., execute) one or more of the following steps. The algorithm may propagate tentative positions to the current time using the VIO velocity estimates (e.g., update the tentative positions with the VIO velocity estimates up to the current time). The algorithm may discard pseudoranges that cannot be LOS consistent with any position. These are measurements that, if LOS, would force other measurements to have negative NLOS noise. These measurements may be found efficiently by solving a linear program. The algorithm may randomly choose a number of (e.g., three) past or current epochs and a number of (e.g., two) pseudoranges from each epoch. Using these observations (e.g., six observations) and the VIO displacement, the algorithm may compute a new tentative position. This procedure may be repeated for a fixed number of times. The algorithm may keep only those tentative positions that are consistent (e.g., that lead to nonnegative estimated NLOS noise components). For each tentative position, the algorithm may find all current and past pseudoranges that are LOS consistent with the position. Tentative positions with few consistent pseudoranges (e.g., less than a threshold number of consistent pseudoranges) may be discarded. The algorithm may recompute each tentative position using all associated LOS-consistent pseudoranges. The algorithm may select the tentative position with the most consistent pseudoranges as the location estimate at the current time.

A carrier-phase fusion module 346 may utilize carrier-phase measurements in addition to pseudorange and Doppler measurements (from a rover, for example). For example, the carrier-phase fusion module 346 may perform carrier-phase GNSS fusion. Differential corrections for these measurements from a reference station may also be utilized. In some configurations, a dual-frequency receiver may be used for challenging scenarios. In some approaches, the initial phase of carrier-phase fusion (e.g., carrier-phase GNSS fusion) may utilize a survey quality antenna for measurements (e.g., GNSS measurements). The antenna characterization may be known (e.g., predetermined). Some configurations of the systems and methods disclosed herein may achieve one or more of the following: relative pose measurements may be outlier-free, relative pose measurements may be always-on, relative pose measurements for position may have a 1% or less drift in a short-term and long-term as a function of distance, and/or relative pose measurements for velocity, gravity, and/or orientation may have small error.

Figure 4:
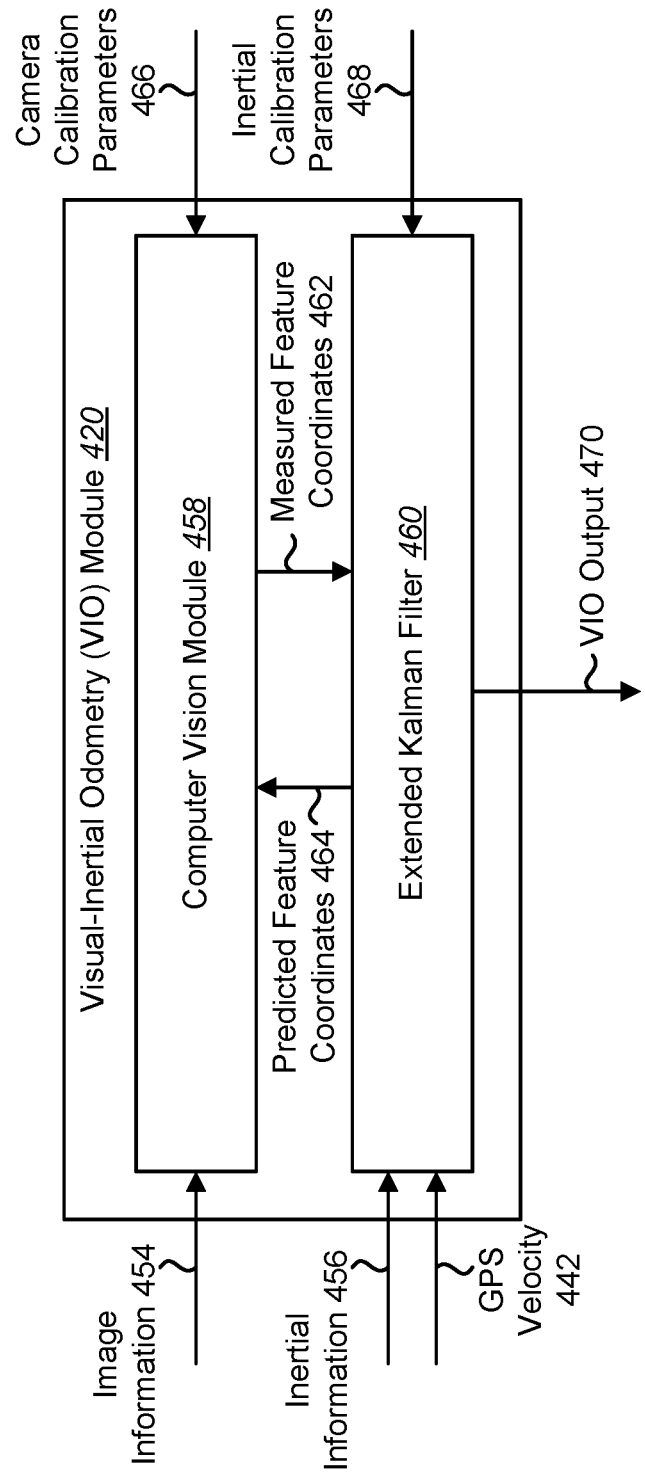
FIG. 4 is a block diagram illustrating an example of a VIO module.

FIG. 4 is a block diagram illustrating an example of a VIO module 420. The VIO module 420 described in connection with FIG. 4 may be an example of the VIO module 320 described in connection with FIG. 3. In some configurations, the VIO module 420 may be implemented in the electronic device 102 described in connection with FIG. 1. The VIO module 420 may include a computer vision module 458 and/or an extended Kalman filter module 460. The VIO module 420 may be implemented in one or more platforms (e.g., mobile platforms, autonomous vehicles, semi-autonomous vehicles, etc.) with one or more use cases (e.g., vehicle control, navigation, augmented reality, robotics, virtual reality, etc.).

The computer vision module 458 may obtain (e.g., receive) image information 454 (e.g., one or more images, camera frames, time stamps, etc.). For example, the computer vision module 458 may receive image information 454 from an image sensor (e.g., camera). The image information 454 may take many forms. As described herein, for example, image information 454 may include image data at Video Graphics Array (VGA) resolution (640×480) or Super VGA (SVGA) resolution, monochrome or color (8 bits or higher, for example), wide-angle or conventional lens, at a frame rate of 30 frames per second (fps), and/or with a timestamp in system time. Other formats may be implemented and/or utilized.

The computer vision module 458 may detect and/or track image features in one or more frames based on the image information 454. In some configurations, the computer vision module 458 may receive camera calibration parameters 466 (e.g., intrinsic camera calibration parameters). For example, the camera calibration parameters 466 may include indications of a focal length, principal points, and/or distortion. In some approaches, the camera calibration parameters 466 may only be received once per camera type. The computer vision module 458 may utilize the camera calibration parameters 466 to improve measurement accuracy by tuning for intrinsic camera characteristics.

In some configurations, the computer vision module 458 may receive predicted 2-dimensional (2D) feature coordinates 464 (e.g., predicted 2D image feature coordinates) from the extended Kalman filter 460. The computer vision module 458 may produce measured 2-dimensional image feature coordinates 462 (e.g., pixel position in the image), which may be provided to the extended Kalman filter 460. In some configurations, the computer vision module 458 may provide time stamps and/or measured noise (of the camera(s), for example), which may be provided to the extended Kalman filter 460.

The extended Kalman filter 460 may receive inertial information 456 (e.g., IMU information, gyroscope measurements, gyroscope time stamps, gyroscope measurement noise, accelerometer measurements, accelerometer time stamps, and/or accelerometer measured noise, etc.). The extended Kalman filter 460 may receive inertial calibration parameters 468 (e.g., camera IMU alignment calibration parameters). The inertial calibration parameters 468 may indicate spatial (e.g., rotation and/or translation) parameters and/or a time parameter. In some approaches, the inertial calibration parameters may be received once per board type. In some configurations, the extended Kalman filter 460 may receive a GPS velocity 442. The GPS velocity 442 may include a speed and/or a heading. The GPS velocity 442 may be received from a global positioning receiver (e.g., the global positioning receiver 122 described in connection with FIG. 1) and/or from a sensor driver. In some configurations, the extended Kalman filter 460 may receive an error (e.g., quality) metric associated with the GPS velocity 442.

The extended Kalman filter 460 may provide (e.g., output) a VIO output 470 (e.g., extended Kalman filter (EKF) output). The VIO output 470 may include one or more informational elements. For example, the VIO output 470 may include a pose (e.g., a camera pose, and electronic device 102 pose, a vehicle pose, a six degrees of freedom (6-DOF) pose, etc.), gravity information (e.g., a gravity vector), one or more feature point locations (e.g., 3-dimensional (3D) locations of feature points), and/or one or more calibration parameters (e.g., bias(es), scale factor(s), alignment, etc.).

For a vehicular (e.g., automotive) use case, one or more of the following points may be factors that the VIO design may accommodate. One factor may be initialization at a fixed position. For example, VIO may operate on a camera that is at a fixed position inside a vehicle. VIO may be able to initialize one or more parameters without moving the device. In some approaches, VIO may be initialized while the electronic device is stationary. Some configurations may provide a warm start capability. Another factor may be the inclusion of vehicle motion constraints (which may be referred to as non-holonomic constraints) into a kinematic model. Another factor may be operation with a wide-dynamic range (WDR) camera, under extreme variations in lighting. For example, this may involve dealing with multiple exposure(s) contributing to each frame (apart from rolling shutter, for instance). Another factor may include dealing effectively with outlier features from moving objects (e.g., large moving objects such as cars in a camera field of view (FOV)). Another factor may include an ability to re-initialize VIO (e.g., the extended Kalman filter (EKF) 460) while moving. Since the pose output of VIO may be used as an input to enhance GPS position estimates, an accurate model for (VIO) pose error may be utilized for fusion purposes. Some approaches may rely on a sliding window implementation in VIO of camera poses corresponding to GPS epochs. Another factor may include calibration procedures for estimating the 'lever arm' between image sensor(s) (e.g., camera(s)), inertial sensor(s) (e.g., IMU), vehicle body frame, and/or global positioning (e.g., GPS) antenna, etc.

Figure 5:
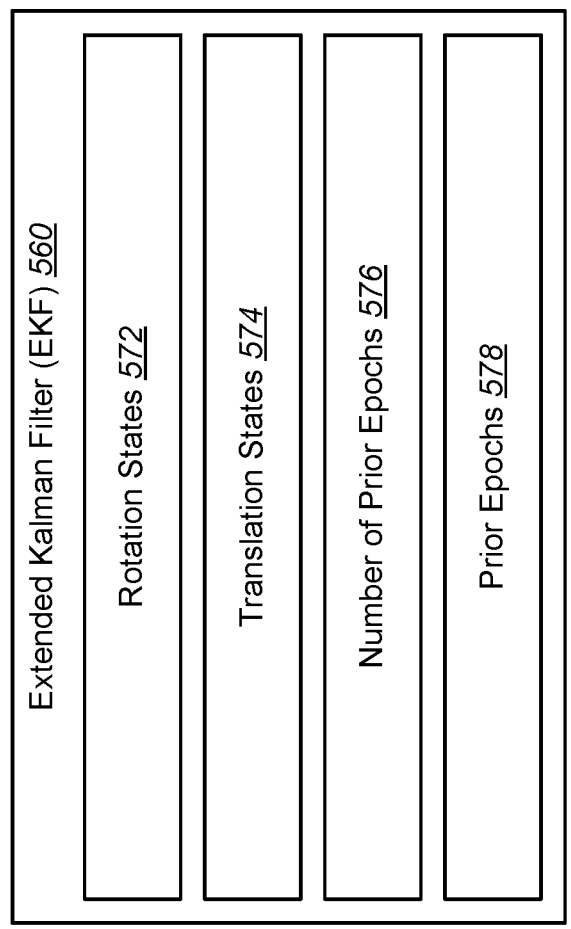
FIG. 5 is a block diagram illustrating an example of an extended Kalman filter (EKF)

FIG. 5 is a block diagram illustrating an example of an extended Kalman filter (EKF) 560. The EKF 560 may be an example of one or more of the Kalman filters described herein (e.g., the extended Kalman filter 460 described in connection with FIG. 4). In some configurations, the EKF 560 may utilize sliding window outputs at GPS epochs. Compared to other approaches to VIO, the EKF 560 may include additional states. The additional states may include rotation states 572 (e.g., vehicle rotation states in 3D, for example) and translation states 574 (in 3D, for example) at prior epochs 578 (e.g., past GPS time epochs). A number of prior epochs 576 (e.g., prior GPS epochs) may be configurable. For example, the number of prior epochs may be configurable from N=2, 3, . . . , 64. In some approaches, the length of the window may be fixed. Accordingly, the (GPS) time instants may slide across time with the addition of each new epoch (e.g., GPS epoch) corresponding to the removal of the last epoch (e.g., GPS epoch).

Accordingly, the poses of VIO corresponding to the GPS epochs in the sliding window may get continuously updated as new camera frames are received. This may provide a benefit of 'refining' past VIO pose estimates with subsequent (e.g., 'future') information. This may be viewed as an instance of VIO providing 'smoothing' filtered outputs at GPS epochs. A reduction in the error in the relative displacements from VIO may be observed when using the 'smoothed' outputs from the GPS sliding window.

In some approaches, the covariance across the poses in the GPS sliding window may be available (e.g., immediately available) from the EKF covariance matrix computation. This may enable more accurate characterization of the error covariance of the relative displacement of the vehicle between GPS epochs.

Even with an increased EKF state size, significant benefits may be observed (even for window sizes of N=2, 4, etc., for example). It should also be noted that outlier removal and GPS fusion may also benefit from the improved accuracy of the relative displacements from VIO.

In some approaches, the EKF 560 may use current measurements to correct and make the VIO module outputs at prior GPS epochs more accurate. For instance, some EKF states (e.g., additional EKF states) may include vehicle rotation states 572 (in 3D, for example) and translation states 574 (in 3D, for example). A fusion module (e.g., the fusion module 336 described in connection with in FIG. 3) may use the corrected VIO module output at prior GPS epochs to filter out outlier GPS measurements.

Consider an example with three sequential GPS epochs A, B, and C. In one instance, the relative displacement of the vehicle between epochs A and C, and between epochs B and C may be determined by using the instantaneous output of the VIO module at time instants A, B, and C. An alternate, improved estimation of these relative displacements is obtained by incorporating epochs A and B inside the EKF state and updating the VIO output poses at epoch C. In this instance, new measurements between epochs A and C can improve the accuracy of VIO module output pose at epoch A. Likewise, new measurements between epoch B and epoch C can improve the accuracy of the VIO module output at epoch B. Then, a GPS fusion module (e.g., element 336 in FIG. 3) may determine a first relative displacement from the first GPS epoch A to the second GPS epoch B using the modified VIO estimates, as well as a second relative displacement from the first GPS epoch A to the third GPS epoch C using the modified VIO state estimates. Note that the relative displacements are determined using the modified VIO outputs instead of the instantaneous VIO outputs.

Figure 6:
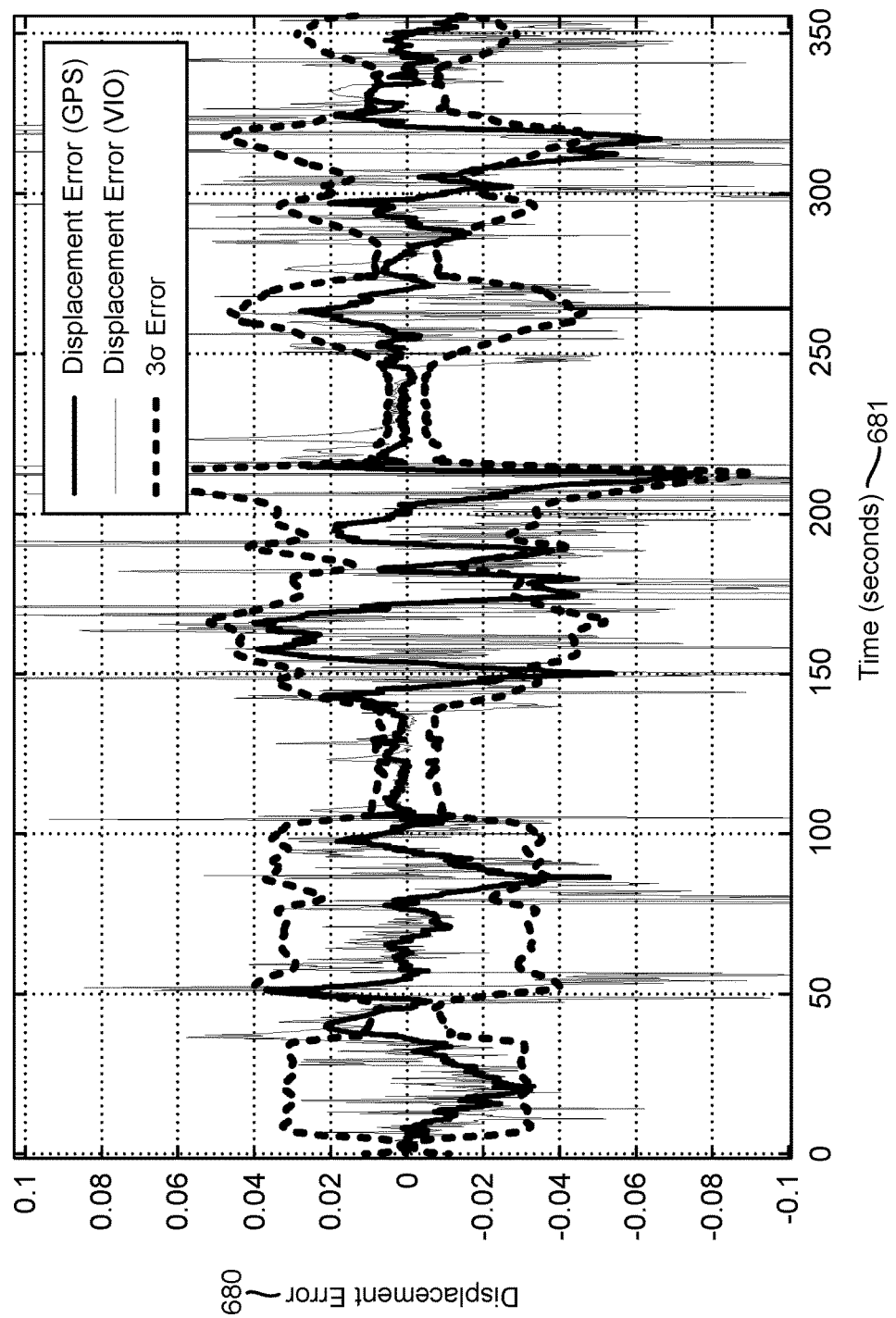
FIG. 6 is a graph illustrating displacement error over time.

FIG. 6 is a graph illustrating displacement error 680 over time 681 (in seconds). In particular, the graph illustrates test results in terms of a displacement error 680 over time 681 for an implementation of the systems and methods disclosed herein. As can be observed, the displacement error computed from the GPS sliding window may not vary as much as the displacement error computed from the VIO output. For example, it can be observed that the GPS displacement error generally stays within the 3σ error relative to a ground truth, while the VIO displacement error may vary more than the 3σ error.

Figure 7:
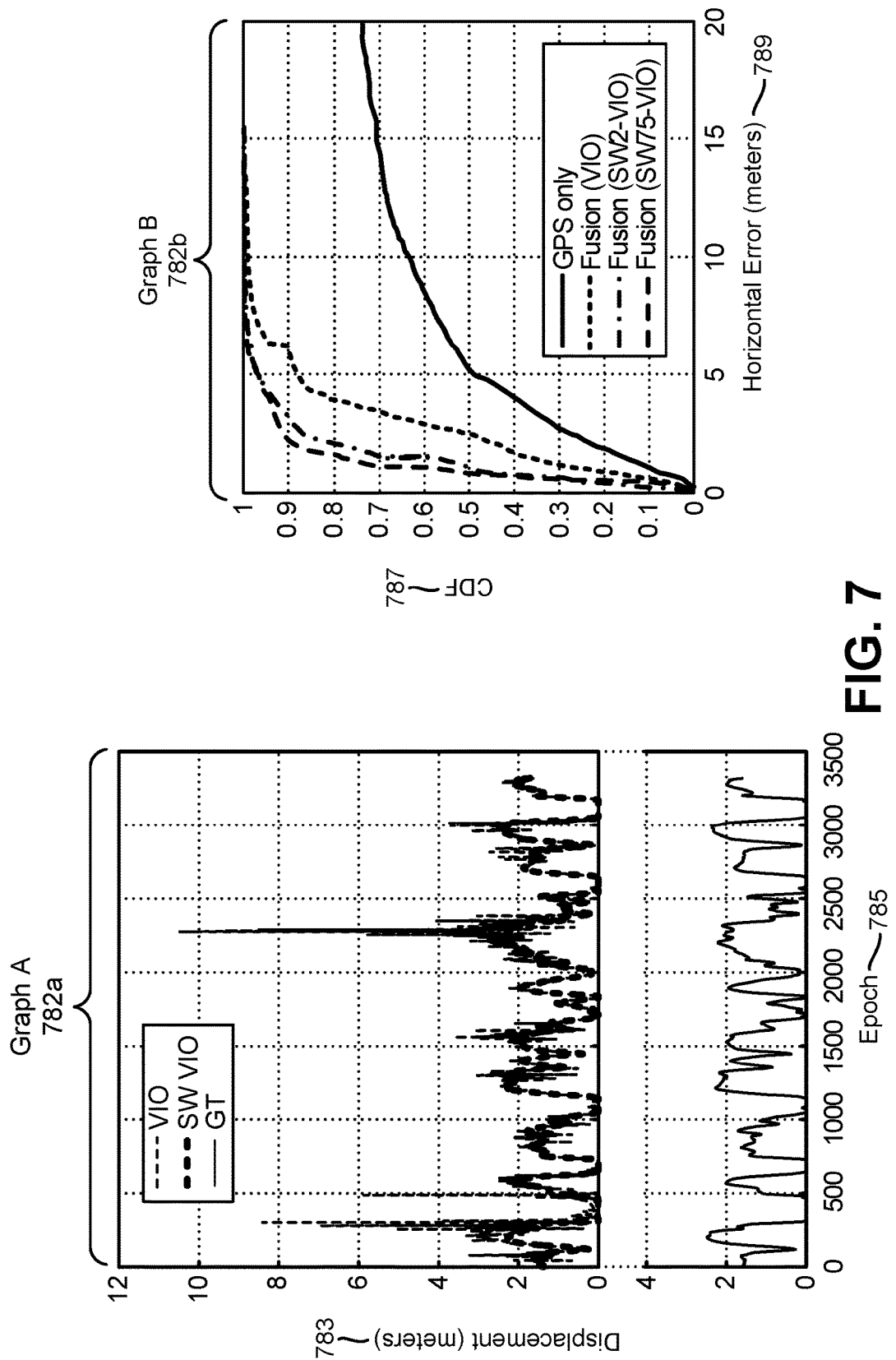
FIG. 7 illustrates graphs of a displacement and a cumulative distribution function.

FIG. 7 illustrates graphs 782a-b of a displacement 783 and a cumulative distribution function 787 (CDF). In particular, graph A 782a illustrates a displacement 783 (in meters) over epochs 785. Graph A 782a compares the performance of VIO to the performance of VIO with a sliding window (SW VIO) in accordance with some configurations of the systems and methods disclosed herein. As can be observed, VIO with a sliding window provides performance that is much closer to the ground truth (GT) (shown in the lower portion of graph A 782a) compared to VIO (without a sliding window).

Graph B 782b illustrates a CDF 787 (e.g., an error CDF) over horizontal error 789. In particular, graph B 782b compares the performance of pure GPS to the performance of GPS and VIO fusion (Fusion (VIO), to the performance of GPS and VIO fusion with a sliding window having two prior epochs (Fusion (SW2-VIO)), and to the performance of GPS and VIO fusion with a sliding window having 75 prior epochs (Fusion (SW75-VIO)). As can be observed, using a sliding window with two prior epochs performs nearly as well as using 75 prior epochs.

As described herein, the sliding window (e.g., GPS sliding window) may integrate one or more prior epochs up to the current measured GPS epoch. In particular, the Kalman filter (e.g., EKF) may include state augmentation for the epochs (e.g., body poses) in the sliding window. It should be noted that as the size of the sliding window length grows larger, the state and/or covariance of the Kalman filter also grows larger, which may result in slower performance. Table (1) illustrates the effect of sliding window (SW) size on performance.

TABLE (1)

| | SW size | | | | | | | | |
|---|---|---|---|---|---|---|---|---|---|
| | 2 | 3 | 4 | 5 | 6 | 7 | 8 | 9 | 10 |
| trial 1 | 14.98 | 15.76 | 16.25 | 18.77 | 18.95 | 18.71 | 20.38 | 21.95 | 23 |
| trial 2 | 15.2 | 15.98 | 16.3 | 17 | 17.78 | 18.65 | 21.13 | 20.94 | 22.6 |
| trial 3 | 15.47 | 15.62 | 16.6 | 17.19 | 18.59 | 19.03 | 19.97 | 20.25 | 22.13 |
| mean | 15.22 | 15.79 | 16.38 | 17.65 | 18.44 | 18.8 | 20.49 | 21.05 | 22.58 |

Figure 8:
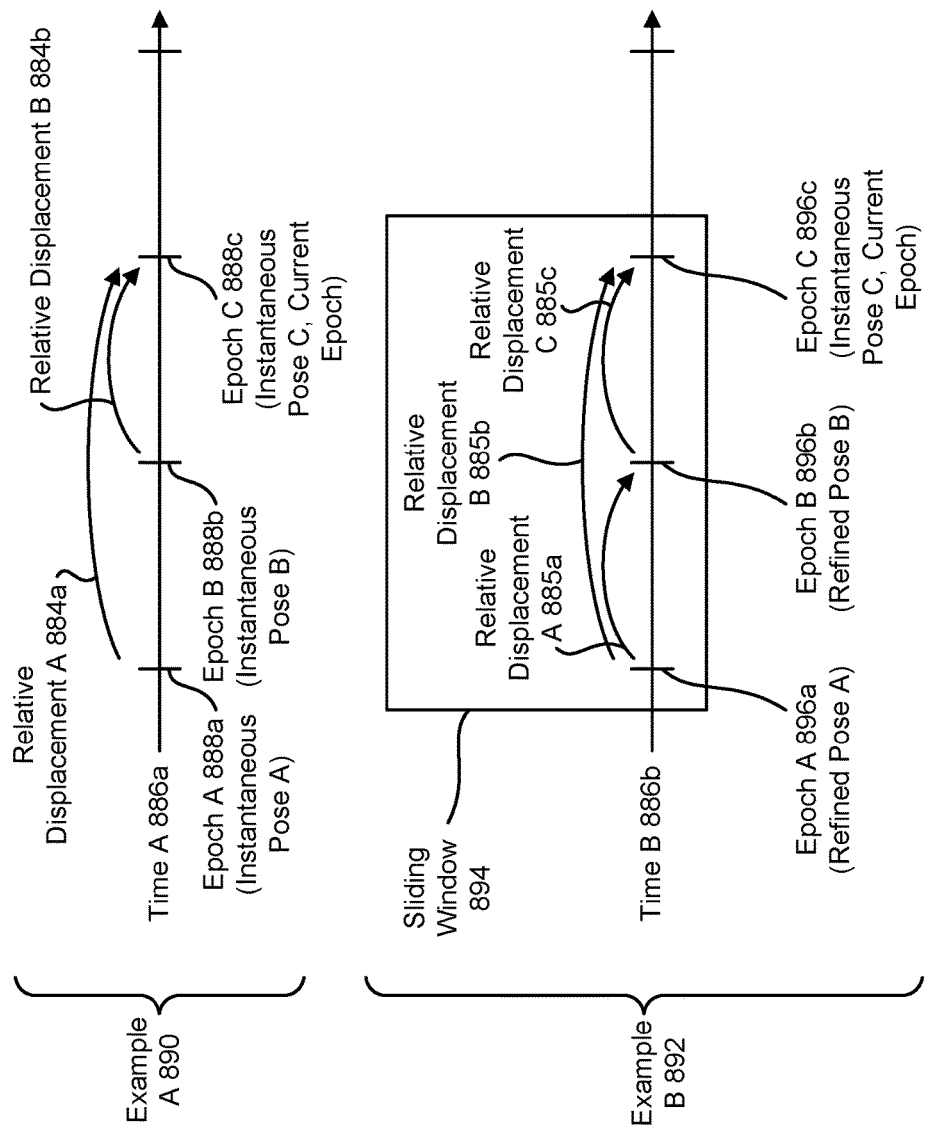
FIG. 8 is a diagram illustrating examples of a sliding window in accordance with some configurations of the systems and methods disclosed herein.

FIG. 8 is a diagram illustrating examples of a sliding window 894 in accordance with some configurations of the systems and methods disclosed herein. In particular, FIG. 8 illustrates example A 890 without a sliding window (e.g., without prior pose states in a Kalman filter). Example A 890 illustrates three sequential GPS epochs: epoch A 888a, epoch B 888b, and epoch C 888c over time A 886a. Relative displacement A 884a of the vehicle between epoch A 888a and epoch C 888c and relative displacement B 884b between epoch B 888b and epoch C 888c may be determined by using the instantaneous output (e.g., pose A, pose B, and pose C) of a VIO module at epochs A-C 888a-c (e.g., time instants A, B, and C).

Example B 892 illustrates a sliding window 894 for improved estimation of relative displacements. Example B 892 illustrates three sequential GPS epochs: epoch A 896a, epoch B 896b, and epoch C 896c over time B 886b. In particular, improved estimation of one or more relative displacements (e.g., relative displacement A 885a, relative displacement B 885b, and/or relative displacement C 885c) may be obtained by incorporating epoch A 896a and epoch B 896b inside the EKF state and updating the VIO output poses at epoch C 896c. In this instance, new measurements between epoch A 896a and epoch C 896c can improve the accuracy of VIO module output pose at epoch A 896a. Likewise, new measurements between epoch B 896b and epoch C 896c can improve the accuracy of the VIO module output at epoch B 896b. Then, a GPS fusion module (e.g., element 336 in FIG. 3) may determine a first relative displacement (e.g., relative displacement A 885a) from the first GPS epoch A 896a to the second GPS epoch B 896b using the modified VIO estimates, as well as a second relative displacement (e.g., relative displacement B 885b) from the first GPS epoch A 896a to the third GPS epoch C 896c using the modified VIO state estimates. Note that the relative displacements are determined using the modified VIO outputs instead of the instantaneous VIO outputs.

Figure 9:
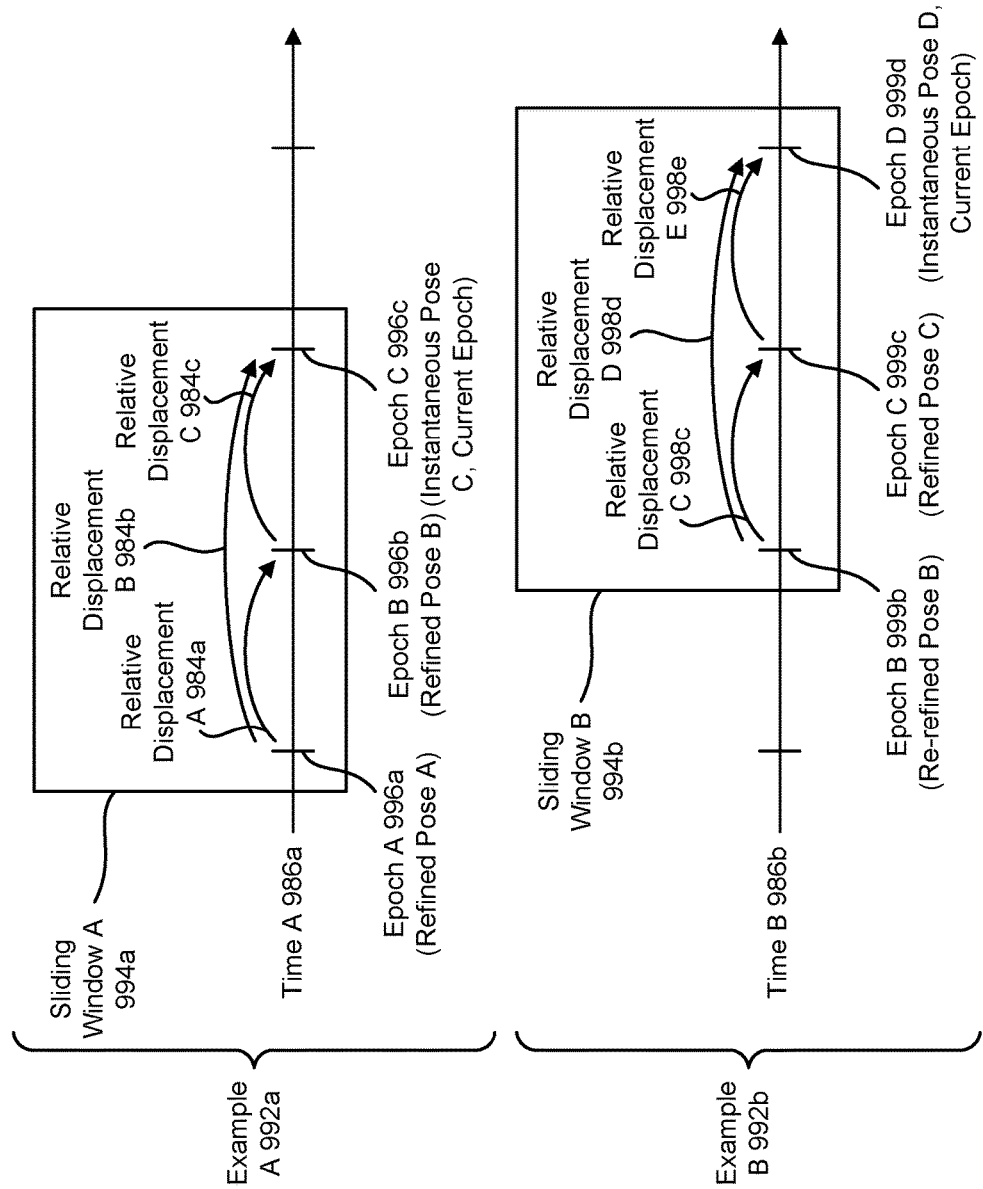
FIG. 9 is a diagram illustrating examples of EKF state updating based on a sliding window in accordance with some configurations of the systems and methods disclosed herein.

FIG. 9 is a diagram illustrating examples 992a-b of EKF state updating based on a sliding window 994a-b in accordance with some configurations of the systems and methods disclosed herein. Example A 992a illustrates three sequential GPS epochs: epoch A 996a, epoch B 996b, and epoch C 996c over time A 986a. As illustrated in example A 992a, prior poses (e.g., EKF states) within sliding window A 994a may be refined based on subsequent measurements. This may result in refined pose A corresponding to epoch A 996a and refined pose B corresponding to epoch B 996b. Relative displacement A 984a, relative displacement B 984b, and/or relative displacement C 984c may be determined based on refined pose A, refined pose B, and instantaneous pose C (corresponding to epoch C 996c.

Example B 992b illustrates movement of sliding window B 994b, where epoch D 999d is the current epoch. For example, sliding window A 994a may move to sliding window B 994b as time progresses. Example B 992b illustrates three sequential GPS epochs: epoch B 999a, epoch C 999c, and epoch D 999d over time B 986b. As illustrated in example B 992b, prior poses (e.g., EKF states) within sliding window B 994b may be refined based on subsequent measurements. This may result in re-refined pose B corresponding to epoch B 999b and refined pose C corresponding to epoch C 999c. Relative displacement C 998c, relative displacement D 998d, and/or relative displacement E 998e may be determined based on re-refined pose B, refined pose C, and instantaneous pose D (corresponding to epoch D 999d.

Figure 10:
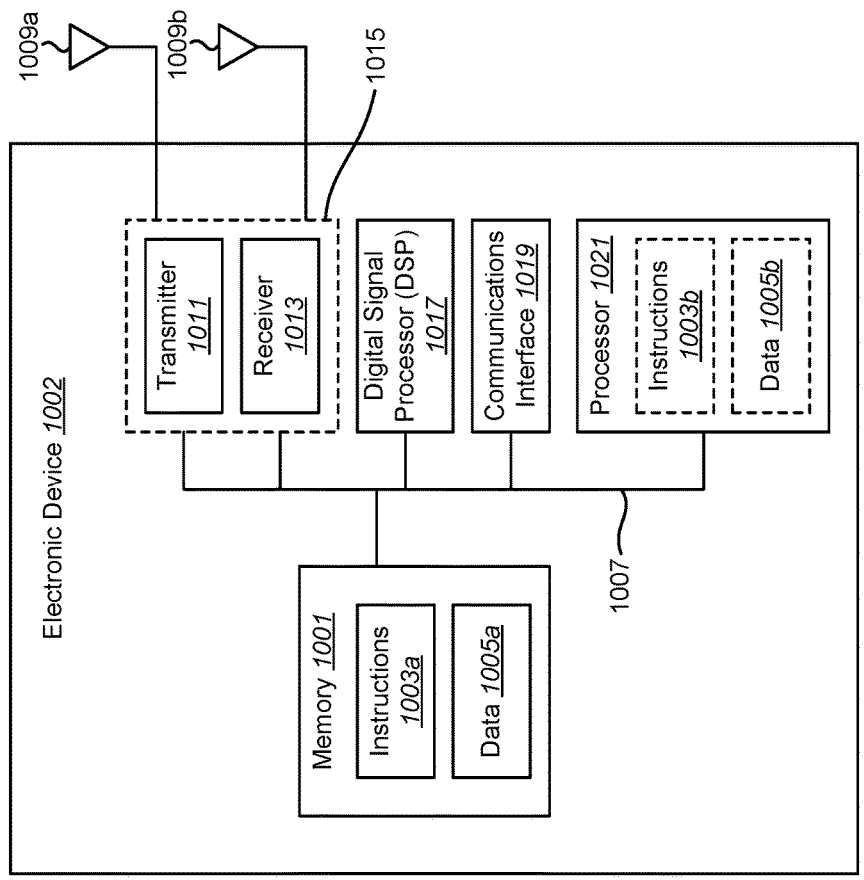
FIG. 10 illustrates certain components that may be included within an electronic device configured to implement various configurations of the systems and methods disclosed herein.

FIG. 10 illustrates certain components that may be included within an electronic device 1002 configured to implement various configurations of the systems and methods disclosed herein. Examples of the electronic device 1002 may include servers, cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, mounted cameras, connected cameras, robots, aircraft, drones, unmanned aerial vehicles (UAVs), gaming consoles, personal digital assistants (PDAs), etc. The electronic device 1002 may be implemented in accordance with one or more of the electronic devices described herein.

The electronic device 1002 includes a processor 1021. The processor 1021 may be a general purpose single- or multi-chip microprocessor (e.g., an ARM), a special purpose microprocessor (e.g., a digital signal processor (DSP)), a microcontroller, a programmable gate array, etc. The processor 1021 may be referred to as a central processing unit (CPU). Although just a single processor 1021 is shown in the electronic device 1002, in an alternative configuration, a combination of processors (e.g., an ARM and DSP) could be implemented.

The electronic device 1002 also includes memory 1001. The memory 1001 may be any electronic component capable of storing electronic information. The memory 1001 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1005a and instructions 1003a may be stored in the memory 1001. The instructions 1003a may be executable by the processor 1021 to implement one or more of the methods, procedures, steps, and/or functions described herein. Executing the instructions 1003a may involve the use of the data 1005a that is stored in the memory 1001. When the processor 1021 executes the instructions 1003, various portions of the instructions 1003b may be loaded onto the processor 1021 and/or various pieces of data 1005b may be loaded onto the processor 1021.

The electronic device 1002 may also include a transmitter 1011 and/or a receiver 1013 to allow transmission and reception of signals to and from the electronic device 1002. The transmitter 1011 and receiver 1013 may be collectively referred to as a transceiver 1015. One or more antennas 1009a-b may be electrically coupled to the transceiver 1015. The electronic device 1002 may also include (not shown) multiple transmitters, multiple receivers, multiple transceivers and/or additional antennas.

The electronic device 1002 may include a digital signal processor (DSP) 1017. The electronic device 1002 may also include a communications interface 1019. The communications interface 1019 may allow and/or enable one or more kinds of input and/or output. For example, the communications interface 1019 may include one or more ports and/or communication devices for linking other devices to the electronic device 1002. In some configurations, the communications interface 1019 may include the transmitter 1011, the receiver 1013, or both (e.g., the transceiver 1015). Additionally or alternatively, the communications interface 1019 may include one or more other interfaces (e.g., touchscreen, keypad, keyboard, microphone, camera, etc.). For example, the communication interface 1019 may enable a user to interact with the electronic device 1002.

The various components of the electronic device 1002 may be coupled together by one or more buses, which may include a power bus, a control signal bus, a status signal bus, a data bus, etc. For the sake of clarity, the various buses are illustrated in FIG. 10 as a bus system 1007.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. It should also be noted that one or more steps and/or actions may be added to the method(s) and/or omitted from the method(s) in some configurations of the systems and methods disclosed herein.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and electronic device described herein without departing from the scope of the claims.

What is claimed is:

1. A method for visual inertial odometry (VIO)-aided global positioning, comprising:
   updating an extended Kalman filter (EKF) state comprising a current pose of an electronic device and a sliding window of multiple prior poses using measurements up to a current epoch, wherein the sliding window of multiple prior poses comprises poses of the electronic device at a number of most recent global positioning system (GPS) time epochs, wherein the updating comprises updating an EKF covariance matrix for the prior poses and the current pose in the EKF state;
   determining, at a GPS epoch, a relative displacement between each of the updated prior poses and the current pose;
   determining an error covariance of each of the relative displacements based on cross-covariances between each of the updated prior poses and the current pose in the EKF covariance matrix;
   using the relative displacements and the error covariances to fuse pseudorange measurements taken over multiple epochs; and
   controlling a vehicle based on the fused pseudorange measurements.

2. The method of claim 1, further comprising removing outlier pseudorange measurements from a set of pseudorange measurements based on the relative displacements between the updated prior poses and the current pose.

3. The method of claim 1, further comprising weighting inlier pseudorange measurements using the error covariances of the relative displacements.

4. The method of claim 1, further comprising determining an absolute position fix using inlier pseudorange measurements.

5. The method of claim 1, wherein the relative displacements are determined using VIO measurements, and wherein the relative displacements are utilized to propagate electronic device pose between GPS epochs.

6. The method of claim 1, further comprising determining whether to insert a GPS measurement based on an amount of distance traveled.

7. The method of claim 1, wherein the vehicle comprises the electronic device.

8. An electronic device for visual inertial odometry (VIO)-aided global positioning, comprising:
a memory;
a processor coupled to the memory, wherein the processor is configured to:
update an extended Kalman filter (EKF) state comprising a current pose of the electronic device and a sliding window of multiple prior poses using measurements up to a current epoch, wherein the sliding window of multiple prior poses comprises poses of the electronic device at a number of most recent global positioning system (GPS) time epochs, wherein the updating comprises updating an EKF covariance matrix for the prior poses and the current pose in the EKF state;
determine, at a GPS epoch, a relative displacement between each of the updated prior poses and the current pose;
determine an error covariance of each of the relative displacements based on cross-covariances between each of the updated prior poses and the current pose in the EKF covariance matrix;
use the relative displacements and the error covariances to fuse pseudorange measurements taken over multiple epochs; and
control a vehicle based on the fused pseudorange measurements.

9. The electronic device of claim 8, wherein the processor is configured to remove outlier pseudorange measurements from a set of pseudorange measurements based on the relative displacements between the updated prior poses and the current pose.

10. The electronic device of claim 8, wherein the processor is configured to weight inlier pseudorange measurements using the error covariances of the relative displacements.

11. The electronic device of claim 8, wherein the processor is configured to determine an absolute position fix using inlier pseudorange measurements.

12. The electronic device of claim 8, wherein the processor is configured to determine relative displacements using VIO measurements, and wherein the processor is configured to utilize the relative displacements to propagate electronic device pose between GPS epochs.

13. The electronic device of claim 8, wherein the processor is configured to determine whether to insert a GPS measurement based on an amount of distance traveled.

14. The electronic device of claim 8, wherein the vehicle comprises the electronic device.

15. A non-transitory tangible computer-readable medium storing computer executable code, comprising:
code for causing an electronic device to update an extended Kalman filter (EKF) state comprising a current pose of the electronic device and a sliding window of multiple prior poses using measurements up to a current epoch, wherein the sliding window of multiple prior poses comprises poses of the electronic device at a number of most recent global positioning system (GPS) time epochs, wherein the updating comprises updating an EKF covariance matrix for the prior poses and the current pose in the EKF state;
code for causing the electronic device to determine, at a GPS epoch, a relative displacement between each of the updated prior poses and the current pose;
code for causing the electronic device to determine an error covariance of each of the relative displacements based on cross-covariances between each of the updated prior poses and the current pose in the EKF covariance matrix;
code for causing the electronic device to use the relative displacements and the error covariances to fuse pseudorange measurements taken over multiple epochs; and
code for causing the electronic device to control a vehicle based on the fused pseudorange measurements.

16. The computer-readable medium of claim 15, further comprising code for causing the electronic device to remove outlier pseudorange measurements from a set of pseudorange measurements based on the relative displacements between the updated prior poses and the current pose.

17. The computer-readable medium of claim 15, further comprising code for causing the electronic device to weight inlier pseudorange measurements using the error covariances of the relative displacements.

18. The computer-readable medium of claim 15, further comprising code for causing the electronic device to determine an absolute position fix using inlier pseudorange measurements.

19. The computer-readable medium of claim 15, further comprising:
code for causing the electronic device to determine relative displacements using VIO measurements; and
code for causing the electronic device to utilize the relative displacements to propagate electronic device pose between GPS epochs.

20. The computer-readable medium of claim 15, further comprising code for causing the electronic device to determine whether to insert a GPS measurement based on an amount of distance traveled.

21. The computer-readable medium of claim 15, wherein the vehicle comprises the electronic device.

22. An apparatus, comprising:
means for updating an extended Kalman filter (EKF) state comprising a current pose of the apparatus and a sliding window of multiple prior poses using measurements up to a current epoch, wherein the sliding window of multiple prior poses comprises poses of the apparatus at a number of most recent global positioning system (GPS) time epochs, wherein the updating comprises updating an EKF covariance matrix for the prior poses and the current pose in the EKF state;
means for determining, at a GPS epoch, a relative displacement between each of the updated prior poses and the current pose;
means for determining an error covariance of each of the relative displacements based on cross-covariances between each of the updated prior poses and the current pose in the EKF covariance matrix;
means for using the relative displacements and the error covariances to fuse pseudorange measurements taken over multiple epochs; and
means for controlling a vehicle based on the fused pseudorange measurements.

23. The apparatus of claim 22, further comprising means for removing outlier pseudorange measurements from a set of pseudorange measurements based on the relative displacements between the updated prior poses and the current pose.

24. The apparatus of claim 22, further comprising means for weighting inlier pseudorange measurements using the error covariances of the relative displacements.

25. The apparatus of claim 22, further comprising means for determining an absolute position fix using inlier pseudorange measurements.

26. The apparatus of claim 22, wherein the relative displacements are determined using VIO measurements, and wherein the relative displacements are utilized to propagate apparatus pose between GPS epochs.

27. The apparatus of claim 22, further comprising means for determining whether to insert a GPS measurement based on an amount of distance traveled.

28. The apparatus of claim 22, wherein the vehicle comprises the apparatus.

\* \* \* \* \*